(12) United States Patent
Ohwa et al.

(10) Patent No.: US 7,698,658 B2
(45) Date of Patent: Apr. 13, 2010

(54) DISPLAY CONTROLLING APPARATUS, DISPLAY CONTROLLING METHOD, AND RECORDING MEDIUM

(75) Inventors: Tsunayuki Ohwa, Tokyo (JP); Masashi Hatta, Kanagawa (JP)

(73) Assignee: Sony Corporation, Tokyo (JP)

( * ) Notice: Subject to any disclaimer, the term of this patent is extended or adjusted under 35 U.S.C. 154(b) by 755 days.

(21) Appl. No.: 11/069,962

(22) Filed: Mar. 3, 2005

(65) Prior Publication Data
US 2005/0210410 A1 Sep. 22, 2005

(30) Foreign Application Priority Data
Mar. 19, 2004 (JP) ............................. 2004-080788

(51) Int. Cl.
G06F 3/00 (2006.01)
G06F 13/00 (2006.01)
G06F 3/048 (2006.01)
G06F 15/00 (2006.01)

(52) U.S. Cl. .................... 715/835; 715/821; 715/767; 715/766; 715/788

(58) Field of Classification Search ................ 715/835, 715/845, 821, 767, 766, 788; 345/418, 427
See application file for complete search history.

(56) References Cited

U.S. PATENT DOCUMENTS 5,295,243 A * 3/1994 Robertson et al. ........... 715/848
6,859,217 B2 * 2/2005 Robertson et al. ........... 715/853
6,910,191 B2 * 6/2005 Segerberg et al. ........... 715/830
6,976,228 B2 * 12/2005 Bernhardson ............... 715/830
2004/0169688 A1 * 9/2004 Burdick et al. ............... 345/854

FOREIGN PATENT DOCUMENTS

WO WO 03/073321 A1 9/2003

* cited by examiner

Primary Examiner—William L Bashore
Assistant Examiner—Jordany Núñez
(74) Attorney, Agent, or Firm—Oblon, Spivak, McClelland, Maier & Neustadt, L.L.P.

(57) ABSTRACT

A display controlling apparatus which displays icons representative of data in layers on a screen, the display controlling apparatus including: an operating section which, based on operations performed by a user, obtains at least instructions for how to display the icons on the screen; a storing section for storing at least data constituting the icons in the layers; a controlling section for generating picture data for displaying the icons in the layers on icon array axes; and a display outputting section for outputting the picture data generated by the controlling section onto a display device; wherein, when the operating section obtains an instruction from the user, the controlling section acting on the instruction generates the picture data in such a manner as to move each of the icon array axes into a different direction together with the icons displayed in an array on each of the axes.

21 Claims, 15 Drawing Sheets

DISPLAY CONTROLLING APPARATUS, DISPLAY CONTROLLING METHOD, AND RECORDING MEDIUM

BACKGROUND OF THE INVENTION

The present invention relates to a display controlling apparatus, a display controlling method, and a recording medium for displaying at least icons onto a screen.

Today, personal computers and home appliances handling digital data have gained widespread acceptance. The popularization of such digital equipment is making it easy for the general public to record TV broadcasts onto hard disks or other media and to store user-captured still or moving pictures into memory cards or other suitable storage devices.

The still pictures and other forms of content thus recorded can be quite numerous. The stored items of content may then be searched for and retrieved using corresponding thumbnail icons. These tasks are performed illustratively by information processing apparatuses such as one disclosed in Japanese Patent Laid-open No. 2002-74322. The disclosed apparatus displays a list of thumbnail icons representative of content items in spiral fashion on a time series basis.

With these information processing apparatuses, however, the content items corresponding to the displayed thumbnail icons are not structured in layers. That means all thumbnail icons are subject to search. If there are a large number of thumbnail icons being displayed, it could take inordinately long to check one icon at a time in search for desired content items. This can be a frustratingly inefficient exercise.

SUMMARY OF THE INVENTION

The present invention has been made in view of the above circumstances and provides a display controlling apparatus, a display controlling method, and a recording medium for displaying icons representative of layered data in such a manner as to allow the user easily to understand where any given icon is situated in the overall layered structure.

In carrying out the invention and according to a first aspect thereof, there is provided a display controlling apparatus for displaying icons representative of data in layers on a screen. The display controlling apparatus including: an operating section which, based on operations performed by a user, obtains at least instructions for how to display the icons on the screen; a storing section for storing at least data constituting the icons in the layers; a controlling section for generating picture data for displaying the icons in the layers on icon array axes; and a display outputting section for outputting the picture data generated by the controlling section onto a display device; wherein, when the operating section obtains an instruction from the user, the controlling section acting on the instruction generates the picture data in such a manner as to move each of the icon array axes into a different direction together with the icons displayed in an array on each of the axes.

Through the use of the display controlling apparatus according to the first aspect of the invention, each icon array axis together with the icons arrayed thereon is moved into a different direction on the screen based on the user's instructions, regardless of the layers in which the icons on that icon array axis exist. This structure allows the icons of the different layers on a given icon array axis to move altogether, so that the user can have a clear view of the loci on which the icons are moved and get to know the layers in which these icons exist. This makes it possible to shorten the time required to search for desired icons layer by layer.

According to a second aspect of the invention, there is provided a display controlling apparatus for displaying icons representative of data in layers on a screen. The display controlling apparatus including: an operating section which, based on operations performed by a user, obtains at least instructions for how to display the icons on the screen; a storing section for storing at least data constituting the icons in the layers; a controlling section for generating picture data for displaying the icons in the layers in such a manner that the icons in one layer are arrayed on an icon array axis in a first direction on the screen, that the icons under the icon located at an intersection of the first direction and a second direction are arrayed on an icon array axis in the second direction, and that the icons under any one of the icons arrayed on the icon array axis in the second direction are arrayed on an icon array axis in a third direction intersecting a plane formed by the first direction and the second direction; and a display outputting section for outputting the picture data generated by the controlling section onto a display device; wherein, when the operating section obtains an instruction from the user for selecting any one of the icons arrayed on the icon array axis in the second direction, the controlling section acting on the instruction generates the picture data in such a manner that the icon array axis in the second direction is moved from there into the first direction, that the icon array axis in the third direction is moved from there into the second direction, and that the selected icon is moved to the intersection of the first direction and the second direction. If there are more icons under any one of the icons arrayed on the icon array axis in the second direction, these additional icons may be displayed in the third direction.

Through the use of the display controlling apparatus according to the second aspect of the invention, the icons on the screen are arrayed on the icon array axes in the first, the second, and the third directions starting from the icons in a given layer arrayed on the icon array axis in the first direction. The icons arrayed in the second direction are formed by the icons coming under that icon in the first direction which is displayed at the intersection of the first and the second directions. The icons arrayed in the third direction come under the icons arrayed in the second direction. This structure makes it easy for the user visually to recognize, especially, the layer of the icon displayed at the intersection as opposed to the icons in layers above or under the icon at the intersection.

Preferably, the picture data may have a first direction area formed in the first direction, a second direction area formed in the second direction, and a divided space bounded by the first and second direction areas; when the operating section obtains an instruction from the user for selecting any one of the icons arrayed on the icon array axis in the second direction, the controlling section acting on the instruction may move the icon array axis positioned in the first direction into the divided space. This structure allows the user visually to recognize the layer of the icon displayed at the intersection as opposed to the icons in layers above or under the icon at the intersection.

Preferably, the icon array axis in the first direction may be a horizontal axis, the icon array axis in the second direction may be a vertical axis, and the icon array axis in the third direction may be a depth axis.

Preferably, when the operating section obtains an instruction from the user for selecting any one of the icons arrayed on the icon array axis in the second direction, the controlling section acting on the instruction may move the icon array axis positioned in the third direction into the second direction in such a manner that a plurality of icons arrayed in imbricate fashion on the icon array axis in the third direction are arrayed in nonoverlapping fashion on the icon array axis in the second direction. This structure enables the icons arrayed in the third direction under the selected icon to move from there into the second direction together with the icon array axis while drawing their loci on the screen, so that the icons in the same layer are arrayed in the second direction for display at a glance. Such displays allow the user to have a clear view of the icons in the currently selected layer as opposed to the icons in upper and lower layers. The user can search for desired icons efficiently through the icons being displayed in the at-a-glance format. Alternatively, the icons in layers above the selected icon may be moved along with their icon array axis into the divided space for display while drawing their loci. The upper-layer icons moved into the divided space may then be displayed in slightly imbricate fashion to minimize the display space they occupy on the screen.

The icon displayed at the intersection may preferably be highlighted. This structure makes it possible for the user to have a visual recognition of the currently selected layer.

The selected icon may preferably be highlighted. This structure enables the user to have a visual recognition of the selected icon and thereby to make an unfailing selection of any desired icon.

Preferably, the icon in the highest layer within a group of icons may be at least one of a picture, a text, and a sound button representative of the content genre to which the icon group belongs. The icons may be layered at least category by category or genre by genre.

Preferably, a group of icons may include thumbnail pictures that correspond to genre-wise groups of content on a one-to-one basis.

According to a third aspect of the invention, there is provided a display controlling method for displaying icons representative of data in layers on a screen. The display controlling method including the steps of: based on operations performed by a user, obtaining at least instructions for how to display the icons on the screen; generating picture data for displaying the icons in the layers on icon array axes; and outputting the generated picture data; wherein, given an instruction from the user, the picture data generating step acting on the instruction generates the picture data in such a manner as to move each of the icon array axes into a different direction together with the icons displayed in an array on each of the axes.

According to a fourth aspect of the invention, there is provided a display controlling method for displaying icons representative of data in layers on a screen. The display controlling method including the steps of: based on operations performed by a user, obtaining at least instructions for how to display the icons on the screen; generating picture data for displaying the icons in the layers in such a manner that the icons in one layer are arrayed on an icon array axis in a first direction on the screen, that the icons under the icon located at an intersection of the first direction and a second direction are arrayed on an icon array axis in the second direction, and that the icons under any one of the icons arrayed on the icon array axis in the second direction are arrayed on an icon array axis in a third direction intersecting a plane formed by the first direction and the second direction; and outputting the generated picture data; wherein, given an instruction from the user for selecting any one of the icons arrayed on the icon array axis in the second direction, the picture data generating step acting on the instruction generates the picture data in such a manner that the icon array axis in the second direction is moved from there into the first direction, that the icon array axis in the third direction is moved from there into the second direction, and that the selected icon is moved to the intersection of the first direction and the second direction.

Preferably, the picture data may have a first direction area formed in the first direction, a second direction area formed in the second direction, and a divided space bounded by the first and second direction areas; given an instruction at the step of obtaining user instruction for selecting any one of the icons arrayed on the icon array axis in the second direction, the picture data generating step acting on the instruction may move the icon array axis positioned in the first direction into the divided space.

Preferably, given an instruction at the step of obtaining user instruction for selecting any one of the icons arrayed on the icon array axis in the second direction, the picture data generating step acting on the instruction may move the icon array axis positioned in the third direction into the second direction in such a manner that a plurality of icons arrayed in imbricate fashion on the icon array axis in the third direction are arrayed in nonoverlapping fashion on the icon array axis in the second direction.

Preferably, the icon displayed at the intersection or any selected icon may be highlighted.

The icons in each of the layers may preferably contain icon groups each represented by a folder icon, or groups of icons that are displayed in imbricate fashion.

According to a fifth aspect of the invention, there is provided a recording medium which records in computer-readable fashion a computer program for causing a computer to carry out a display controlling method for displaying icons representative of data in layers on a screen. The display controlling method including the steps of: based on operations performed by a user, obtaining at least instructions for how to display the icons on the screen; generating picture data for displaying the icons in the layers in such a manner that the icons in one layer are arrayed on an icon array axis in a first direction on the screen, that the icons under the icon located at an intersection of the first direction and a second direction are arrayed on an icon array axis in the second direction, and that the icons under any one of the icons arrayed on the icon array axis in the second direction are arrayed on an icon array axis in a third direction intersecting a plane formed by the first direction and the second direction; and outputting the generated picture data; wherein, given an instruction from the user for selecting any one of the icons arrayed on the icon array axis in the second direction, the picture data generating step acting on the instruction generates the picture data in such a manner that the icon array axis in the second direction is moved from there into the first direction, that the icon array axis in the third direction is moved from there into the second direction, and that the selected icon is moved to the intersection of the first direction and the second direction.

According to a sixth aspect of the invention, there is provided a display controlling apparatus for displaying icons representative of data in layers on a screen. The display controlling apparatus including: an operating section which, based on operations performed by a user, obtains at least instructions for how to display the icons on the screen; a storing section for storing at least data constituting the icons in the layers; a controlling section for generating picture data for displaying at least the icons in the layers on the screen; and a display outputting section for outputting the picture data generated by the controlling section onto a display device; wherein the picture data has a first direction area formed in a first direction on the screen, a second direction area in a second direction intersecting the first direction on the screen, and a divided space divided by the first direction area and the second direction area on the screen; and wherein the controlling section generates the picture data in such a manner that the icons in one layer are arrayed on an icon array axis and displayed in the first direction area, that the icons in layers under the icon displayed at an intersection of the first direction area and the second direction area are arrayed on an icon array axis and displayed in the second direction area, and that the icons in layers above the intersection including the icons in that one layer are arrayed on an icon array axis and displayed in the divided space. If there is no icon in layers above the icon displayed at the intersection, then no icon is displayed in the divided space; if there is no icon in layers under the icon at the intersection, then no icon is displayed in the second direction area.

Through the use of the display controlling apparatus according to the sixth aspect of the invention, the icons are arrayed on the icon array axes in the first and the second directions. The icons arrayed in the second direction are the icons in layers under that icon in the first direction which is displayed at the intersection. The icons in layers above the icon displayed at the intersection are displayed in the divided space. This structure enables the user easily to have a visual recognition of the icon displayed at the intersection as opposed to the icons in layers above or under the layer of that icon at the intersection.

Preferably, if the operating section obtains an instruction for scrolling the icons in the first direction area based on the operation performed by the user, the controlling section may generate the picture data in such a manner that the icons in the first direction area are scrolled in the first direction and that the icons in layers under the icon displayed at the intersection of the first and the second direction areas are arrayed on the icon array axis and displayed in the second direction area; if the operating section obtains an instruction for scrolling the icons in the second direction area based on the operation performed by the user, the controlling section may generate the picture data in such a manner that the icons in the second direction area are scrolled in the second direction. This structure makes it possible to display the icons in layers under each of the icons arrayed in the first direction.

Preferably, if the operating section obtains an instruction for selecting the icons in the second direction area based on the operation performed by the user, the controlling section may generate the picture data in such a manner that the icons displayed in the first direction area are moved into the divided space together with the icon array axis on which these icons are arrayed as well as the icon selected at the intersection of the first and the second direction areas, that the icons in the second direction area are moved into the first direction area together with the icon array axis on which these icons are arrayed, and that that the icons in layers under the selected icon are arrayed on the icon array axis in the second direction and displayed in the second direction area. With this structure, the icons in layers above the selected icon are moved along with their icon array axis into the divided space while drawing their loci on the screen and are displayed in the divided space; the icons in layers under the selected icon are moved from the second direction area into the first direction area along with their icon array axis while drawing their loci on the screen and are displayed in the first direction area. The structure enables the user to have a clear and easy understanding of the currently selected layer as opposed to the upper and lower layers associated with the icons. The user is thus allowed to search for desired icons efficiently through the layered icons.

The icon displayed at the intersection may preferably be highlighted. This structure makes it possible for the user to have a visual recognition of the currently selected layer.

The selected icon may preferably be highlighted. This structure enables the user to have a visual recognition of the selected icon and thereby to make an unfailing selection of any desired icon.

The icons in each of the layers may preferably contain icon groups each represented by a folder icon, or groups of icons that are displayed in imbricate fashion. Where there exist a plurality of icons, this structure allows the icons to be displayed in groups letting the user know their presence with ease.

Preferably, the icon in the highest layer within a group of icons may be at least one of a picture, a text, and a sound button representative of the content genre to which the icon group belongs. The icons may be layered at least category by category or genre by genre.

Preferably, a group of icons may include thumbnail pictures that correspond to genre-wise groups of content on a one-to-one basis.

According to the invention, as outlined above, icons are layered so that any selected icon is displayed on the screen in distinct contrast to the icons in layers above or under the currently selected layer. This makes it possible to improve the efficiency in searching for desired content items.

Other objects, features and advantages of the present invention will become more apparent in the following specification and accompanying drawings.

DESCRIPTION OF THE PREFERRED EMBODIMENTS

Figure 1:
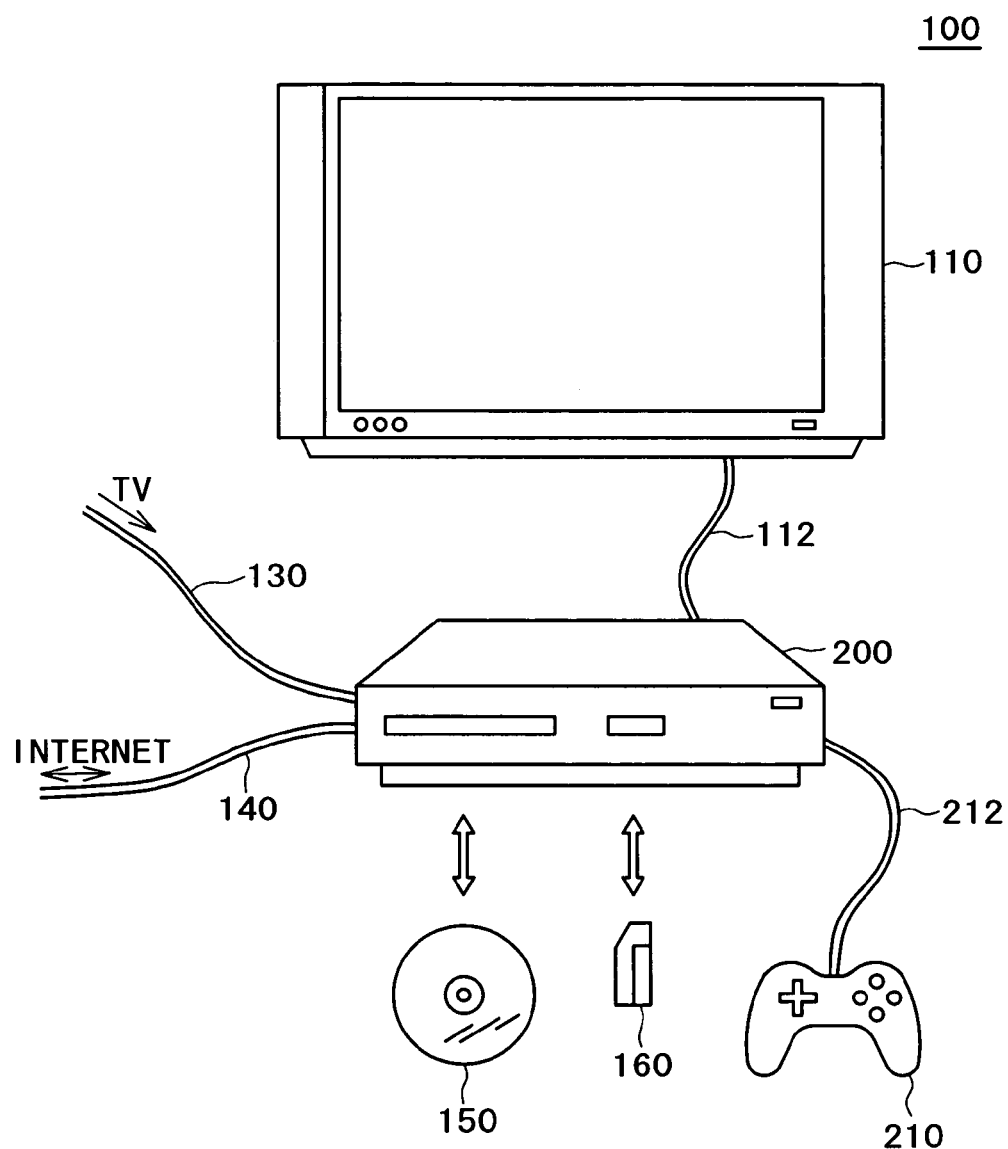
FIG. 1 is an explanatory view showing a basic configuration of a multimedia reproducing system embodying this invention.

Preferred embodiments of this invention will now be described with reference to the accompanying drawings. In the ensuing description and throughout the attached drawings, the components that are substantially the same in function and structure will be designated by the same reference numerals, and their descriptions will be omitted where they are repetitive.

(Components of the Multimedia Reproducing Apparatus)

A basic configuration of a multimedia reproducing system 100 embodying this invention is described below with reference to FIG. 1. The multimedia reproducing system 100 has at its core a multimedia reproducing apparatus (display controlling apparatus) 200 connected to an external TV set (display device) 110 illustratively via a connection cable 112. The TV set 110 has the ability illustratively to display or output pictures and sounds output by the multimedia reproducing apparatus 200.

An operating section 210 is connected to the multimedia reproducing apparatus 200 illustratively via a connection cable 212. The operating section 210 acquires instructions for how to reproduce content based on the user's operations. The operating section 210 may typically double as a video game controller or as a remote controller for controlling diverse functions of the multimedia reproducing apparatus 200.

Various forms of information (e.g., broadcast content, Web content) are input to the multimedia reproducing apparatus 200 through diverse media. Illustratively, broadcast content is input over a TV cable 130 to the multimedia reproducing apparatus 200 as data representative of pictures and sounds from broadcast programs. The broadcast content may be recorded to the multimedia reproducing apparatus 200 or may be reproduced therefrom through decoding and other processes and output to the TV set 110.

The Web content from websites is input to the multimedia reproducing apparatus 200 illustratively via a network 140 such as the Internet. The Web content may be stored into the multimedia reproducing apparatus 200 or may be utilized by its video game capability or by its other functions.

The multimedia reproducing apparatus 200 has the ability to write and/or read data to and/or from an optical disk 150 such as DVD or CD or a detachable memory card 160. For example, the data constituting movies or music albums is read from the optical disk 150 into the multimedia reproducing apparatus 200, and the data making up user-captured still or moving pictures is read from the memory card 160 into the apparatus 200.

Figure 2:
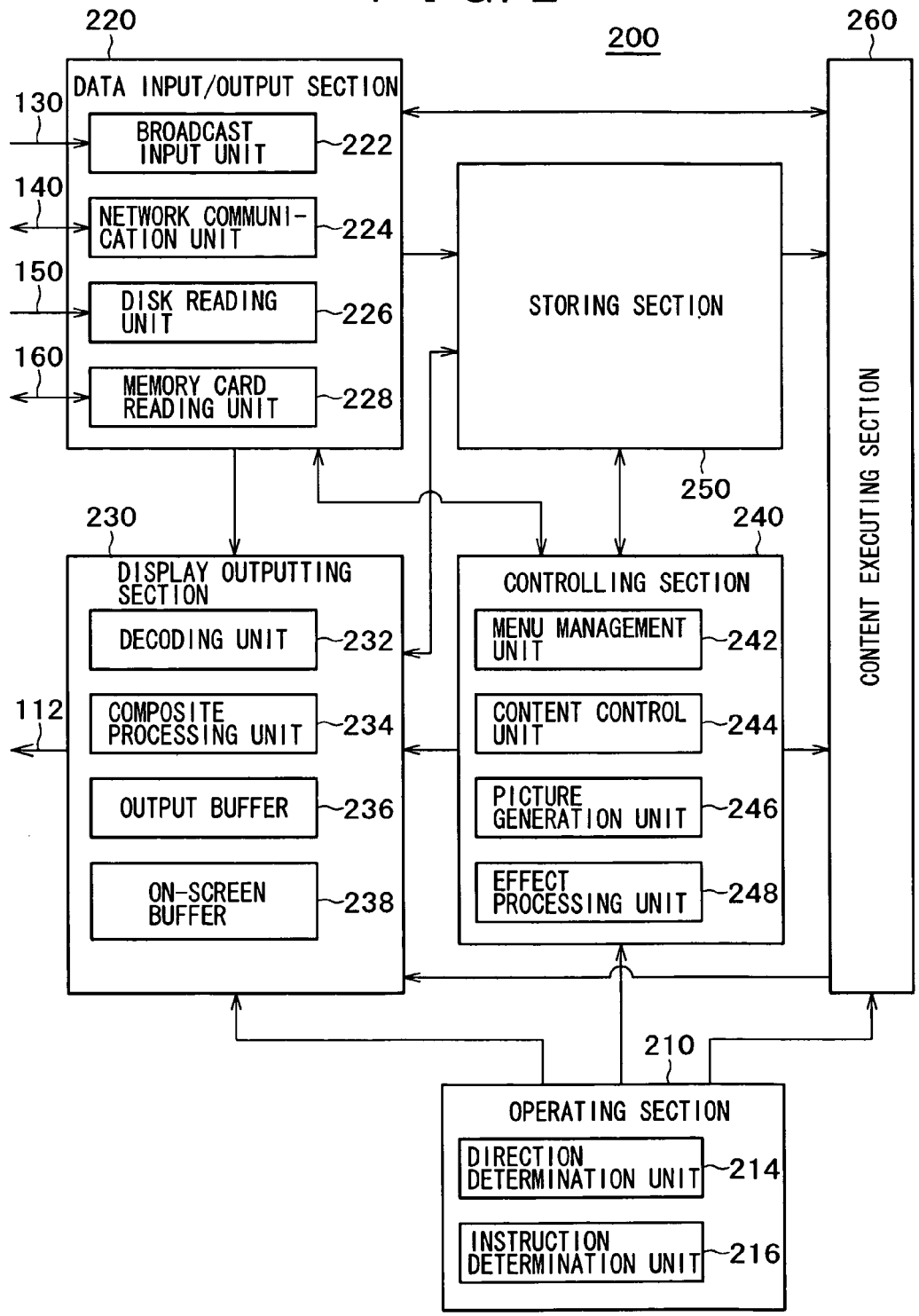
FIG. 2 is a function block diagram indicating a basic structure of a multimedia reproducing apparatus embodying the invention.

The multimedia reproducing apparatus embodying this invention will now be described with reference to FIG. 2. FIG. 2 is a function block schematic diagram indicating a basic structure of the multimedia reproducing apparatus 200. As illustrated, the multimedia reproducing apparatus 200 includes the above-mentioned operating section 210, a data input/output section 220, a display outputting section 230, a controlling section 240, a storing section 250, and a content executing section 260. The multimedia reproducing apparatus 200 may be constituted by hardware, by software, or by a combination of both. In terms of hardware, the multimedia reproducing apparatus 200 may be implemented illustratively by a CPU (central processing unit), a hard disk drive, a memory device, and a rendering circuit of a computer. In software terms, the multimedia reproducing apparatus 200 may be implemented illustratively by programs that make up such functions as data input, data retention, picture processing, and rendering. As described, the function blocks shown in FIG. 2 can be realized in diverse forms using hardware, software, or a combination of both.

The operating section 210 typically has a direction determination unit 214 and an instruction determination unit 216. The direction determination unit 214 acquires an instruction about one of four directions (up, down, left, right) based on the user's operation. The instruction determination unit 216 obtains instructions for content reproduction, stop, menu screen call-up, and other actions based on the user's operations. The direction determination unit 214 and instruction determination unit 216 are constituted by the combination of, for example, a plurality of buttons, circuits and programs respectively for detecting and recognizing operations performed on the buttons. The buttons attached to the direction determination unit 214 may take the form of a cross key or a joystick. The information obtained by the operating section 210 is forwarded to the display outputting section 230, controlling section 240, and content executing section 260.

The data input/output section 220 illustratively includes a broadcast input unit 222 that admits broadcast content through the TV cable 130, a network communication unit 224 that inputs and outputs data such as Web content through the Internet connection 140, a disk reading unit 226 that reads data from the optical disk 150 such as DVD, and a memory card reading unit 228 that writes and reads data to and from the memory card 160. The data input to the data input/output section 220 is forwarded to the display outputting section 230, controlling section 240, storing section 250, and content executing section 260.

The storing section 250 stores broadcast content input through the TV cable 130, Web content input through the Internet cable 140, content such as music and movies read from the optical disk 150, and still and moving pictures read from the memory card reading unit 228. The storing section 250 also accommodates data constituting various icons, such as a plurality of media icons (also called function icons) indicating the types of media from which data can be reproduced, and a plurality of content icons representing content items. Furthermore, the storing section 250 may retain data constituting folder icons indicative of folders as well as thumbnail icons representative of photo pictures in thumbnails. These icons are displayed on a menu screen used for content selection.

For this embodiment, the content items corresponding to the thumbnail icons on a one-to-one basis may be formed by any combination of still pictures, moving pictures, and/or sounds. For example, TV programs, movies, music, radio programs, and/or photos may be presented in desired combinations.

The display outputting section 230 illustratively includes: a decoding unit 232 for decoding encoded data; an output buffer 236 for temporarily storing reproduction data to be output to the TV set 110; an on-screen buffer 238 for temporarily accommodating picture data to be output to the TV set 110 for on-screen display; and a composite processing unit 234 for combining reproduction data with picture data. In keeping with the user's instructions acquired by the operating section 210, the decoding unit 232 decodes the encoded reproduction data such as broadcast content, movies or music received from the data input/output section 220 or storing section 250, and places the decoded data into the output buffer

236. The on-screen buffer 238 illustratively accommodates menu screen picture data generated by the controlling section 240 as picture data for on-screen display. The composite processing unit 234 combines the reproduction data in the output buffer 236 with the menu-screen picture data in the on-screen buffer 238 for conversion into analog signals that are output to the TV set 110.

The controlling section 240 illustratively includes: a menu management unit 242 for managing as menu items the types of media represented by media icons and the functions provided by the media; a content control unit 244 for controlling diverse kinds of content in terms of reproduction or execution; an effect processing unit 248 for processing movements of icons on menu screens; and a picture generation unit 246 for generating picture data constituting the menu screens.

The menu management unit 242 stores the items of content held in the storing section 250, the items of content input through the data input/output section 220, and the currently selected media and content item. The content control unit 244 provides control over reproduction of content from media, input of data through the data input/output section 220, input of data from the storing section 250, and processing by the content executing section 260 in accordance with the user's instructions acquired by the operating section 210.

The picture generation unit 246 illustratively generates a menu screen made up of a plurality of horizontally arrayed media icons and a plurality of vertically arrayed content icons. The two arrays intersect approximately in the middle of the screen. The media icon and the content item displayed at or close to the intersection are highlighted in clear contrast to the remaining icons.

The effect processing unit 248 processes scrolling display of the arrayed media icons and content icons as well as highlighted display of the media icon and content icon of interest. Illustratively, a target icon is highlighted in distinction from the other icons in terms of color and shape; the icon may be varied chromatically or switched to a different color, or may be shown magnified together with movements of transition to the eventual shape.

The content executing section 260 executes a content program such as a video game program retrieved from the storing section 250 or read by the disk reading unit 226 from the optical disk 150. Based on the user's instructions acquired by the operating section 210, the content executing section 260 processes the operations of the content program (i.e., video game program in this case) and outputs the pictures and sounds of the video game to the display outputting section 230.

(Steps in Which the Multimedia Reproducing Apparatus Operates)

Figure 3:
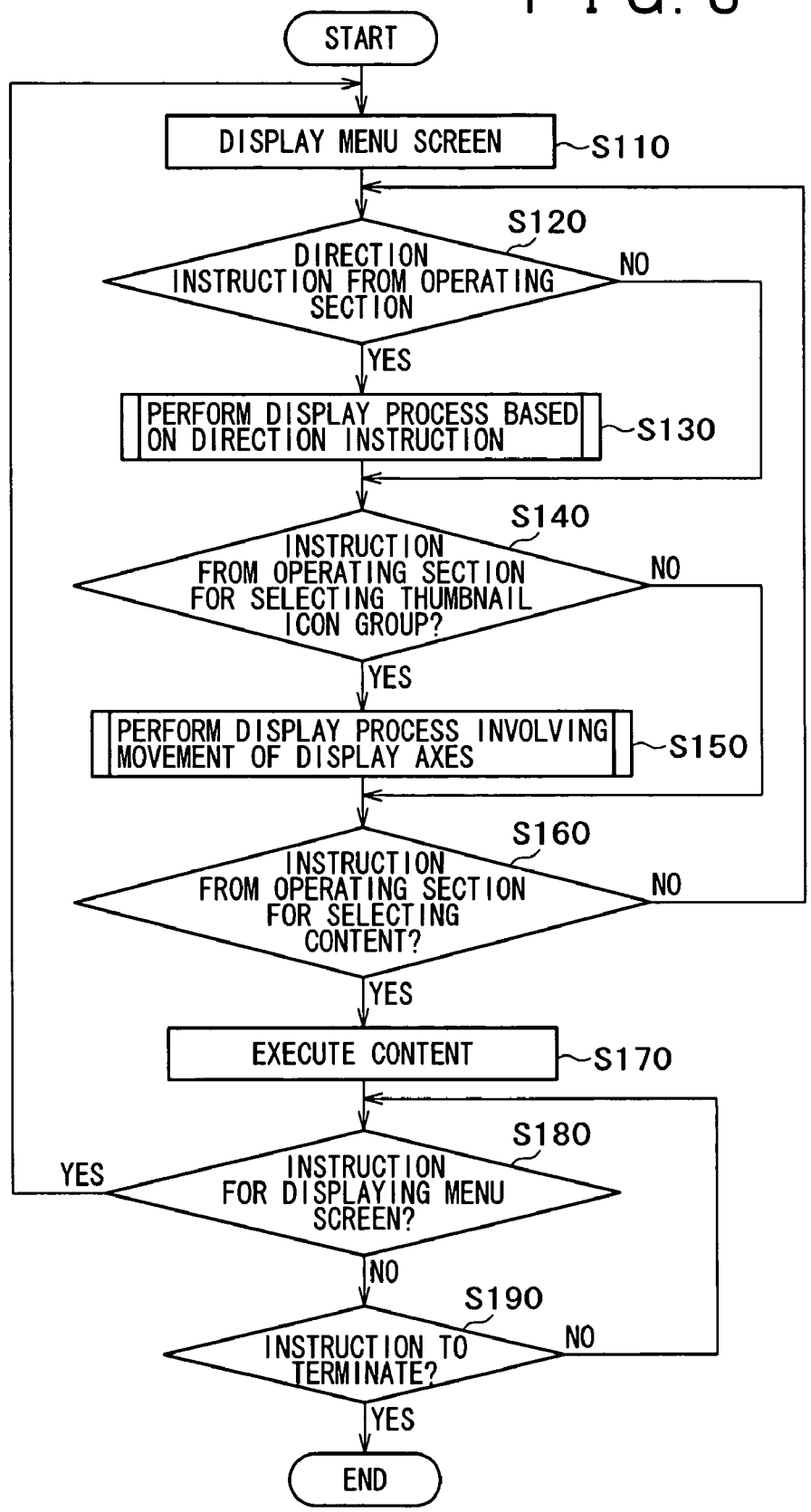
FIG. 3 is a flowchart of steps outlining how the multimedia reproducing apparatus embodying the invention generally works.

Described below with reference to FIG. 3 is a series of steps in which the multimedia reproducing apparatus embodying this invention operates. FIG. 3 is a flowchart of basic steps constituting overall processing performed by the inventive multimedia reproducing apparatus.

As shown in FIG. 3, the user first applies power to the multimedia reproducing apparatus 200 which in turn goes to step S110. In step S110, the picture generation unit 246 generates a menu screen by retrieving data such as media icons and thumbnail icons from the storing section 250. The display outputting section 230 causes the TV set 110 to display the menu screen thus generated.

In step S120, a check is made to determine whether an instruction about any one of the up, down, left, and right directions is acquired by the operating section 210 from the user. If the instruction is found acquired, step S130 is reached.

In step S130, the effect processing unit 248 carries out a display process based on the acquired direction instruction.

Figure 4:
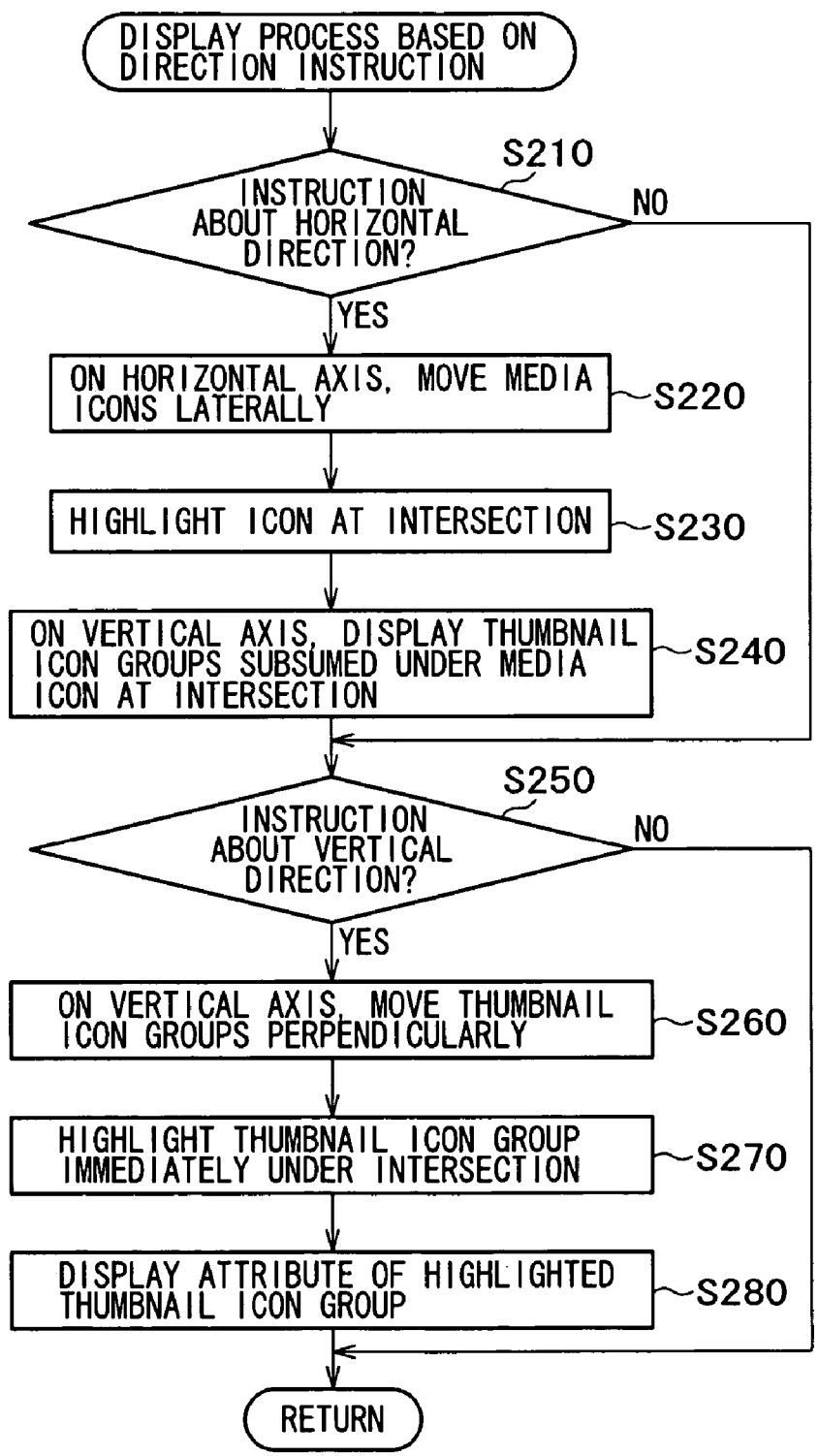
FIG. 4 is a flowchart of steps outlining a display process carried out on the basis of direction instructions according to the invention.

How the display process based on the direction instruction takes place with this embodiment will now be described with reference to FIG. 4. FIG. 4 is a flowchart of steps outlining the display process carried out on the basis of direction instructions according to the invention.

As shown in FIG. 4, when the display process based on the direction instruction is started, the effect processing unit 248 first checks the operating section 210 in step S210 to determine whether the instruction from the user is about the horizontal direction.

If in step S210 the instruction is found to be about the horizontal direction, the media icons arrayed on the horizontal axis are moved horizontally in step S220. Of the horizontally moved media icons, the icon located at the intersection of the horizontal and the vertical axes is highlighted in step S230 to indicate that the icon has been selected.

The highlighting by this embodiment may involve, besides displaying the frame of the media icon in bold lines, changing at least one of brightness, chromaticity, and color saturation; parenthesizing or otherwise marking the media icon from the outside; or giving a 3D display of the media icon.

In step S240, at least one group of thumbnail icons subsumed under the selected media icon is displayed on the vertical axis. A thumbnail icon group is a group of at least one thumbnail icon belonging to one of diverse genres such as sports and music. The thumbnail icon at the top of a given thumbnail icon group is a representative icon indicating the genre or category to which the icons in the group belong.

The representative thumbnail icon is similar to a folder that embraces the icons in a thumbnail icon group. If there is no thumbnail icon positioned under a representative thumbnail icon, then the representative thumbnail icon alone may be displayed so as to indicate the applicable genre, or may be omitted altogether.

Thumbnail icons are pictures that point to content items such as broadcast programs and movies. The thumbnail icons correspond to the content items on a one-to-one basis. That is, the thumbnail icons play the role of expressing meta information about the corresponding content items.

If the instruction is found to be about the vertical direction in step S250, the thumbnail icon groups arrayed on the vertical axis corresponding to the selected media icon are moved vertically in step S260.

Of the vertically moved thumbnail icon groups, the group located immediately under the selected media icon is highlighted in step S270. This indicates that the thumbnail icon group has been selected.

In step S280, an attribute of the thumbnail icon group such as its genre name is displayed illustratively on the right-hand side of the group. Displaying the attribute allows the user to have a more accurate recognition of the thumbnail icons. This completes the series of steps constituting the display process carried out by this embodiment based on direction instructions.

Figure 5:
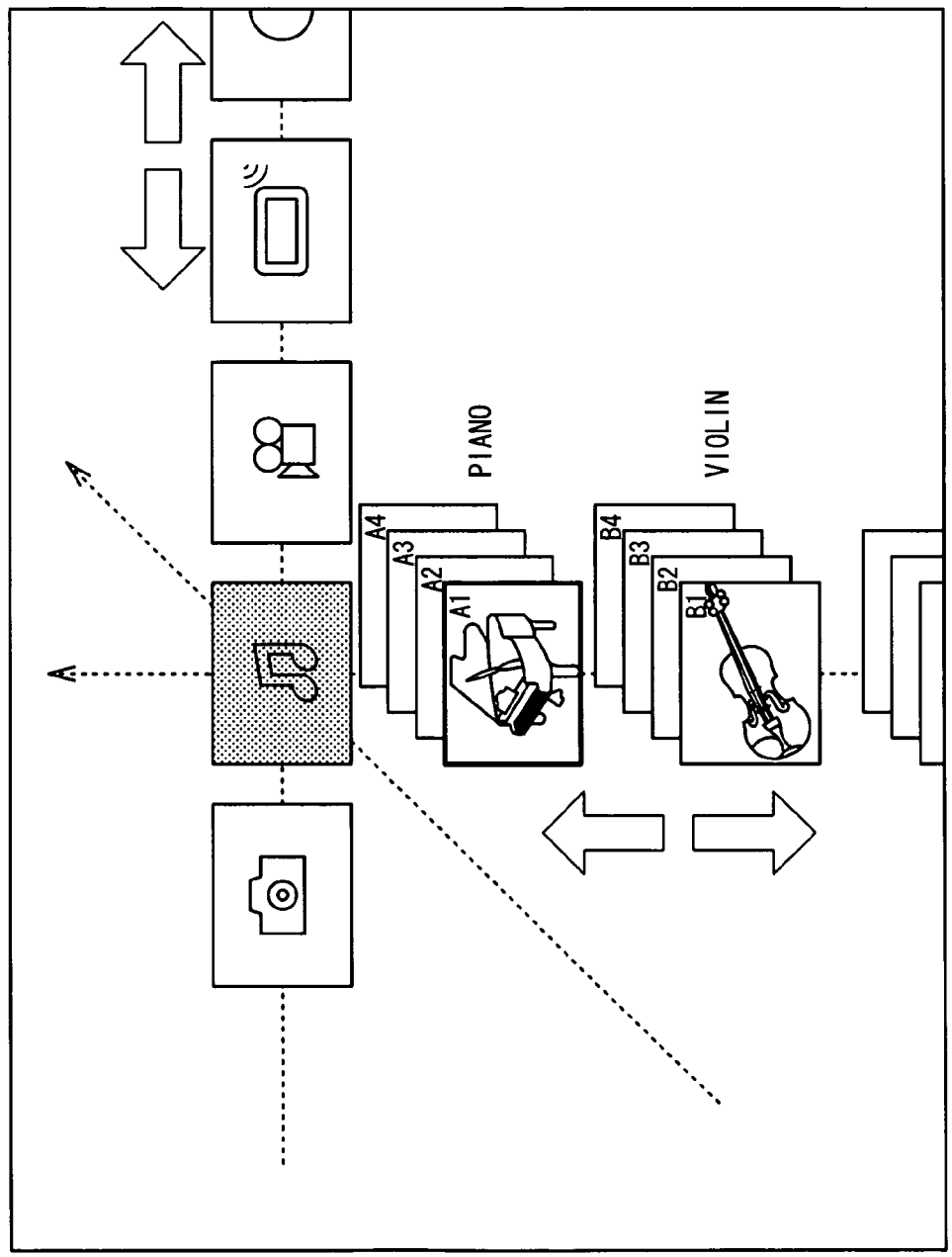
FIG. 5 is an explanatory view depicting a basic structure of a menu screen according to the invention.

What follows is a further explanation, with reference to FIG. 5, of the above-described display process performed on the basis of direction instructions through an initial menu screen that appears upon power-up. FIG. 5 is an explanatory view depicting a basic structure of the menu screen provided by this embodiment.

As shown in FIG. 5, the menu screen that appears when the TV set 110 is turned on displays at least one media icon arrayed on the horizontal axis and at least one group of thumbnail icons on the vertical axis. Although the horizontal and the vertical axes are actually shown on the screen in FIG.

5, this is not limitative of the invention. Alternatively, the axes may be provided in virtual fashion and thus hidden from view on the screen.

In FIG. 5, the horizontal and the vertical axes are shown intersecting at right angles. Alternatively, the two axes may interest at 60 degrees to each other. As another alternative, the horizontal and the vertical axes may be curves, not straight lines.

The thumbnail icon groups arrayed on the vertical axes are in layers under the media icons arrayed on the horizontal axis. For example, under a "musical note" media icon come representative thumbnail icons indicating a piano, a violin, etc., at the top of each of the thumbnail icon groups.

Illustratively, each thumbnail icon group is constituted by one or more content items belonging to a corresponding category such as the piano or violin. If there is no thumbnail icon corresponding to any content item, the top thumbnail icon (i.e., representative thumbnail icon) alone may be displayed or may be omitted altogether.

A desired media icon is selected by having it displayed at the intersection of the horizontal and the vertical axes. The selected media icon is highlighted in gray or some other suitable color as shown in FIG. 5.

When the media icon is selected, the thumbnail icon groups subsumed under the selected icon are displayed. If a given thumbnail icon group contains a plurality of thumbnail icons, they are displayed in an imbricate manner as shown in FIG. 5. With one thumbnail icon group having the attribute "piano" in FIG. 5, four thumbnail icons are displayed in imbricate fashion topped by a representative thumbnail icon A1. If no thumbnail icon exists under a representative thumbnail icon, the representative icon alone may be displayed or may be hidden from view on the screen. Alternatively, each representative thumbnail icon may be replaced by a folder icon or the like.

If the direction determination unit 214 finds in step S210 that an instruction about the horizontal direction is received from the user, step S220 is reached. In step S220, the effect processing unit 248 moves in the horizontal direction the media icons arrayed on the horizontal axis, as indicated by hollow arrows in FIG. 5.

If the direction determination unit 214 finds in step S250 that an instruction about the vertical direction is received from the user, step S260 is reached. In step S260, the effect processing unit 248 moves in the vertical direction the thumbnail icon groups arrayed on the vertical axis, as indicated also by hollow arrows in FIG. 5.

The thumbnail icon group having the attribute "piano" in FIG. 5 is displayed in a bold frame, which indicates that this icon group has been selected. If the user gives another instruction to decide on the selected thumbnail icon group, a plurality of thumbnail icon belonging to this group are displayed on the screen. This feature will be discussed later in more detail.

When the display process based on the acquired direction instruction is finished in step S130, a check is made in step S140 to determine whether an instruction is received through the operating section 210 for selecting a thumbnail icon group. If the selecting instruction is found received in step S140, a display process involving movements of display axes is carried out in step S150. A subroutine constituting this display process is described below in detail. The display axes refer illustratively to the horizontal axis, vertical axis, and depth axis.

Figure 6:
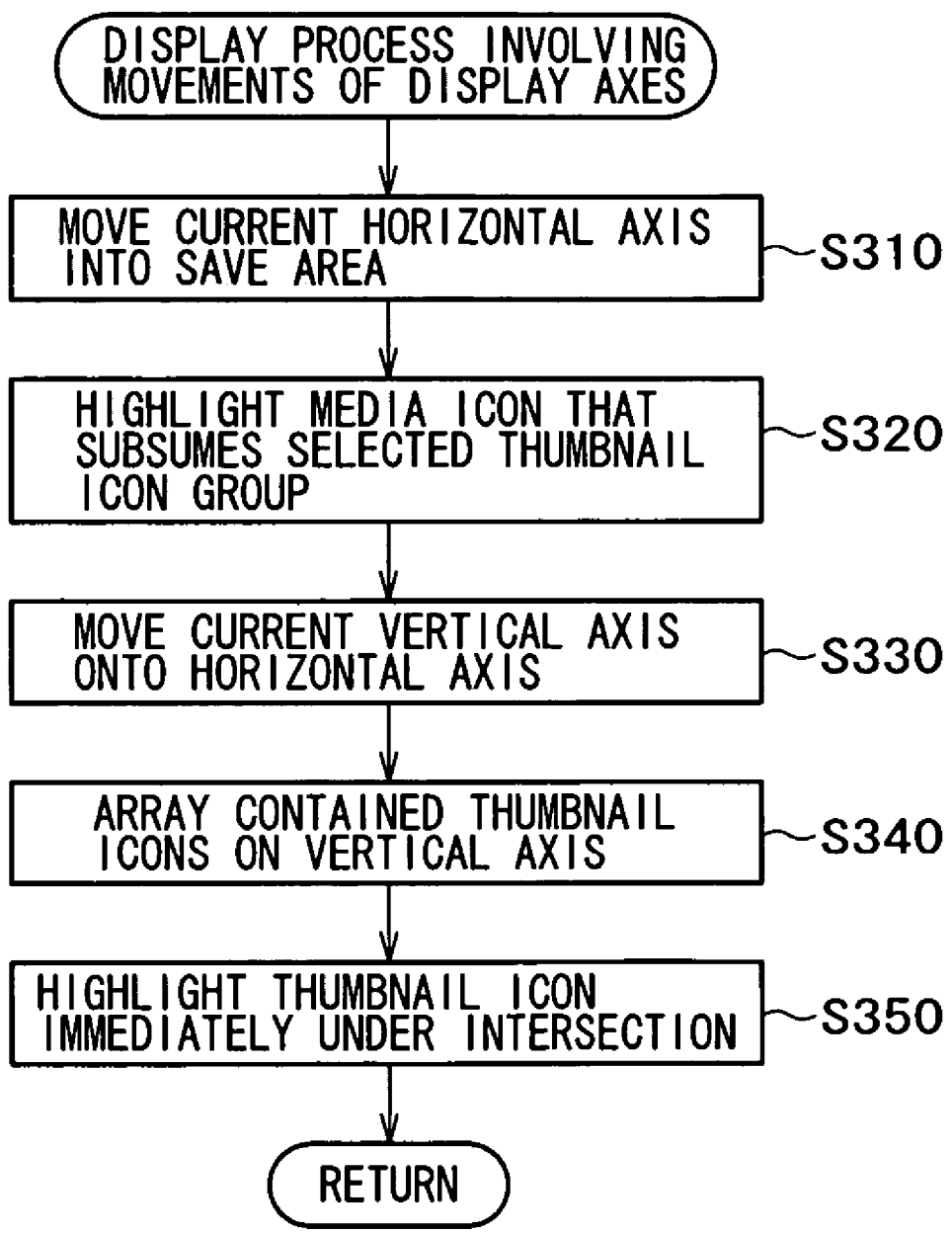
FIG. 6 is a flowchart of steps constituting a display process involving movements of display axes according to the invention.

How the display process involving movements of display axes takes place with this embodiment will now be described with reference to FIG. 6. FIG. 6 is a flowchart of steps outlining the process for display entailing movements of display axes according to the invention.

As shown in FIG. 6, the effect processing unit 248 first moves the current horizontal axis into a save area (i.e., divided space) in step S310. The horizontal axis serving as a display axis (or an icon array axis on which icons are arrayed) has one or more media icons arrayed on it. These media icons are moved into the save area and displayed in imbricate fashion. The horizontal axis may alternatively be a virtual axis not appearing on the screen.

The media icons that were arrayed on the horizontal axis in nonoverlapping fashion are arranged in an imbricate manner when moved into the save area. The arrangement economizes on the area in which to display the media icons.

In step S320, the media icon that subsumes the selected thumbnail icon group is highlighted on the screen. The highlighting of an icon is accomplished illustratively by displaying the icon frame in bold lines, by changing the color of the icon, or by causing the icon to blink.

In step S330, the current vertical axis is moved into the position of the horizontal axis. The vertical axis refers to the display axis (i.e., icon array axis on which to array icons). When the media icons are moved into the save area, the vertical axis together with the thumbnail icon groups arrayed thereon is moved into the position of the horizontal axis on which the media icons were displayed.

The thumbnail icon groups arrayed on the horizontal axis after their movement belong to layers under the media icons moved into the save area. On the screen, the thumbnail icon groups subsumed under the selected media icon are displayed. The thumbnail icon groups that come under a given media icon indicate the genre or category of content associated with the media represented by the media icon in question.

When one of the media icons moved into the save area is highlighted on the screen, it is possible to indicate on the screen the location of the currently selected layer in an overall layered icon structure comprising a plurality of layers of media and content genres.

In step S340, one or more thumbnail icons contained in the highlighted (i.e., selected) thumbnail icon group among the thumbnail icon groups arrayed on the horizontal axis are arrayed on the vertical axis.

The one or more thumbnail icons taken out of the selected group they belong to are arrayed on the vertical axis in step S340. The vertically arrayed thumbnail icons are displayed on the screen of the TV set 110.

At the intersection of the horizontal and the vertical axes, the thumbnail icon at the top of the selected thumbnail icon group is displayed. Under the top thumbnail icon come the other icons displayed successively along the vertical axis. The top thumbnail icon of the group remains highlighted so as to indicate the history of the user's selections.

In step S350, the thumbnail icon immediately under the thumbnail icon located on the vertical axis at the intersection is highlighted. This highlighting indicates that a target thumbnail icon is being selected out of the multiple thumbnail icons contained in the thumbnail icon group. By default (i.e., before the user's operation), the icon immediately under the thumbnail icon displayed at the intersection is highlighted. This completes the series of steps constituting the display process carried out by this embodiment involving the movements of the display axes.

After the display process involving the movements of the display axes is terminated in step S150, the direction determination unit 214 may accept from the user an operation for a vertical scroll. In this case, the effect processing unit 248 scrolls either the thumbnail icons or the cursor vertically on the screen.

In step S160, a check is made to determine whether the user's instruction for selecting a thumbnail icon is received by the instruction determination unit 214. If the selecting instruction is found to be received, the content control unit 244 instructs the display outputting section 230 to start the processing of content corresponding to the selected thumbnail icon, such as reproduction of the corresponding content item.

Given the instruction in step S170, the display outputting section 230 acquires the content item relevant to the thumbnail icon by accessing the storing section 250 or data input/output section 220. The acquired content item is decoded by the decoding unit 232 into a data format suitable for display on the TV set 110, whereby the content is displayed on the TV screen.

A check is made in step S180 to see if the user has issued an instruction for displaying the menu screen. If the instruction is found to be issued, the menu screen is again displayed on the screen in step S110. If an instruction to terminate the process is detected in step S190, then the series of steps performed by the multimedia reproducing apparatus embodying the invention will be brought to an end.

(Screen Displays)

What follows is a further explanation, with reference to FIGS. 7 through 13, of the above-described display process which involves movements of display axes and which is carried out by this embodiment. FIGS. 7 through 13 are explanatory views illustrating typical display screens related to the display process.

Figure 7:
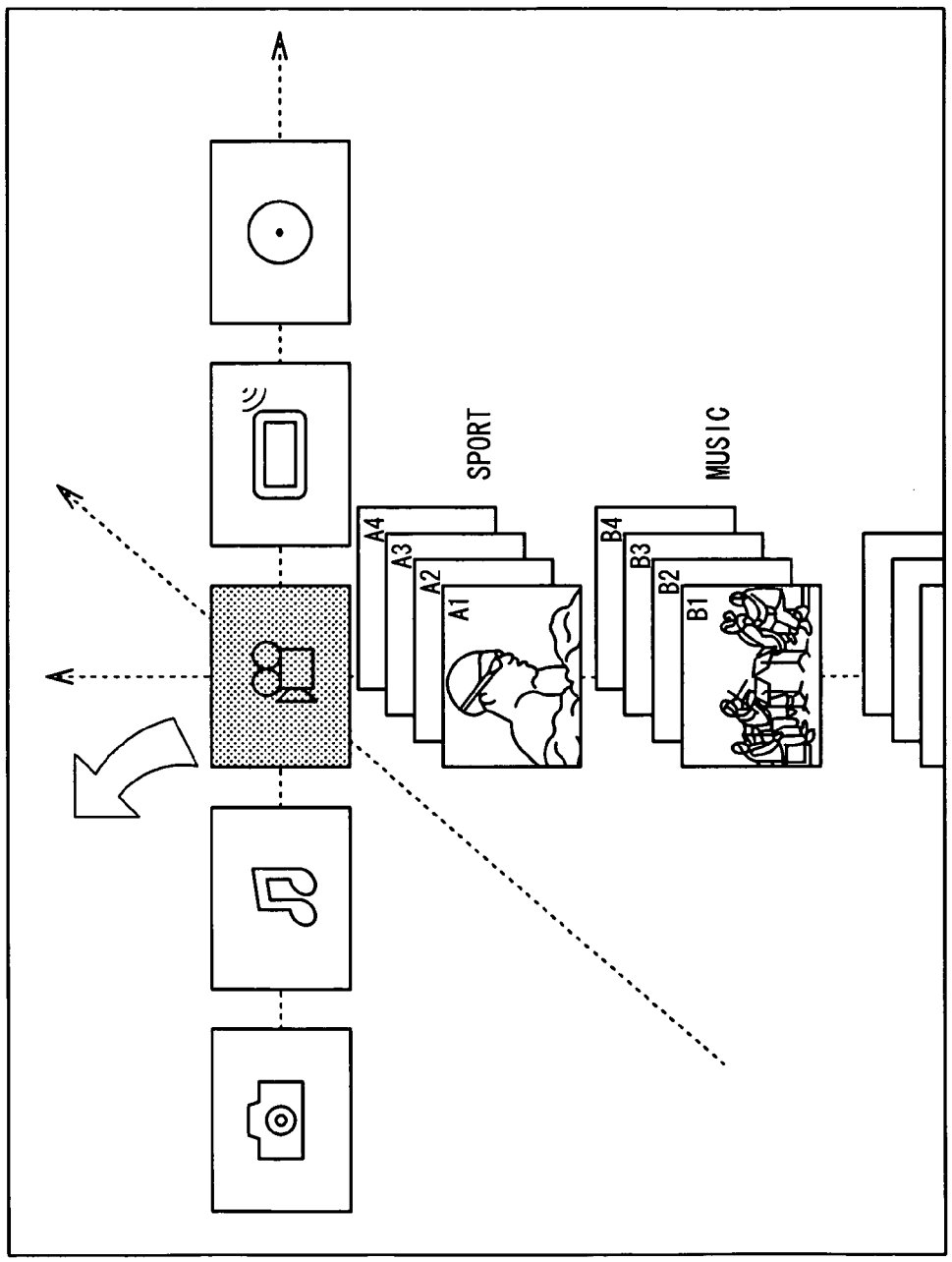
FIG. 7 is an explanatory view of the display process involving the movements of the display axes according to the invention.

As shown in FIG. 7, media icons are arrayed on the horizontal axis and thumbnail content groups are arrayed on the vertical axis. Some display screens to be discussed below are associated with an application in which the display process involving movements of display axes is carried out to search for recorded TV programs. However, these examples are not limitative of the invention.

The media icons on the horizontal axis in FIG. 7 represent the functions provided by the multimedia reproducing apparatus. For example, as depicted in FIG. 7, a "musical note" media icon indicates that this icon subsumes content items for music reproduction.

On the screen of FIG. 7, thumbnail icons are shown denoting content items subsumed under a given media icon. One or more content items in each of different categories are represented by thumbnail icons displayed on the depth axis in imbricate fashion. Although the depth axis is a display axis (i.e., icon array axis on which to array icons), the axis may alternative be a virtual axis hidden from view on the screen.

Illustratively, as shown in FIG. 7, the thumbnail icon group having the attribute "sports" contains a representative thumbnail icon A1 as well as thumbnail icons A2, A3 and A4. The representative thumbnail icon A1 is a picture evocative of the "sports" attribute and comes at the top of the thumbnail icon group.

The user performs an operation to select any one of the thumbnail icons displayed in each category. For example, as indicated in FIG. 7, the user's operation to select the representative thumbnail icon A1 having the "sports" attribute is accepted by the instruction determination unit 216.

When the desired thumbnail icon is selected, the horizontal axis with the media icons arrayed thereon is moved in the direction indicated by a hollow arrow in FIG. 7 (i.e., toward the top left corner of the screen). In this example, media icons are moved into the save area in the top left corner of the screen. However, this is not limitative of the invention. Alternatively, media icons may be moved into the save area located in the top right corner, bottom right corner, or bottom left corner of the screen.

Figure 8:
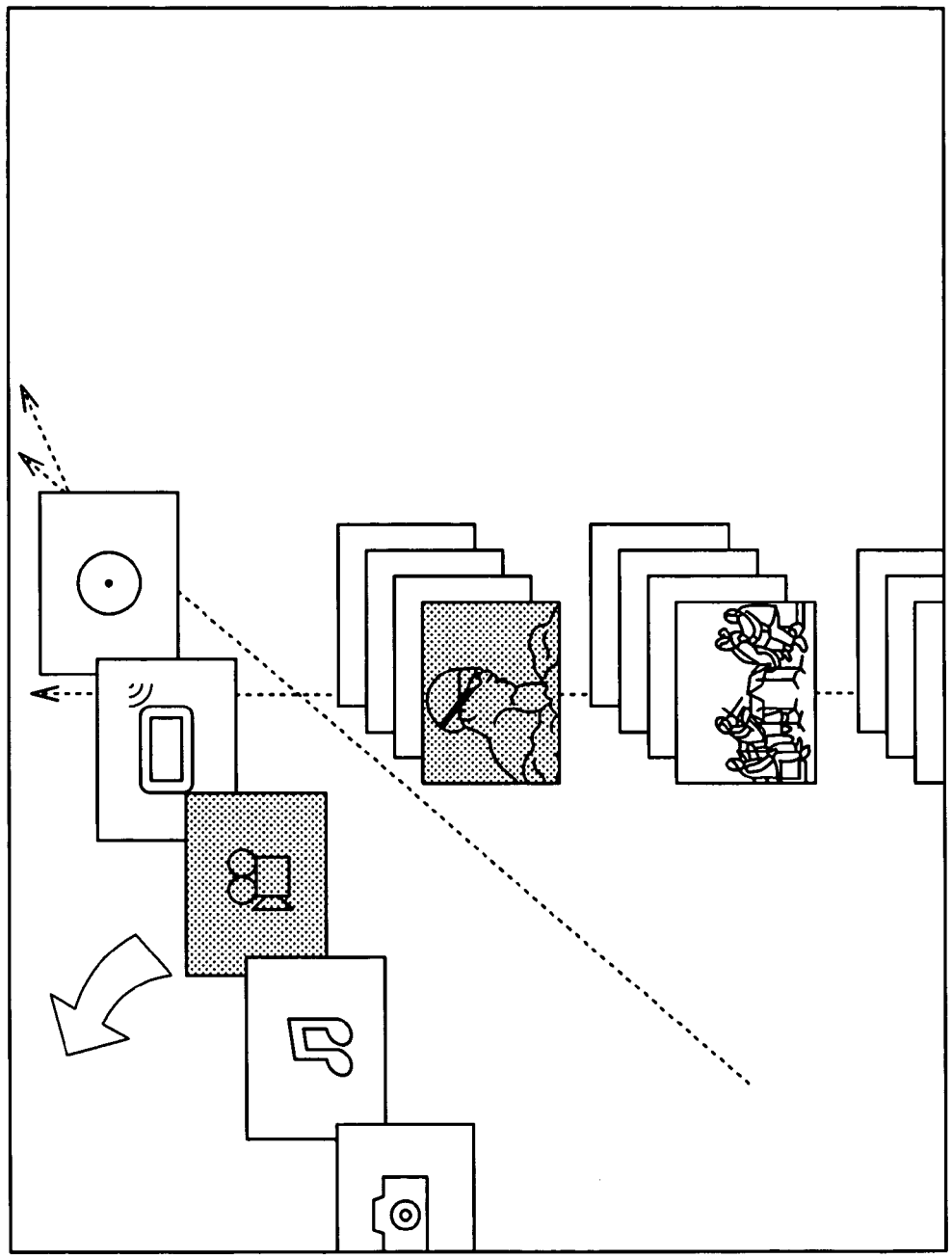
FIG. 8 is another explanatory view of the display process involving the movements of the display axes according to the invention.

As shown in FIG. 8, the media icons that were arrayed on the horizontal axis are now arranged in slightly imbricate fashion while the horizontal axis is hidden from view. As illustrated in FIG. 8, the media icon located on the vertical axis is moved toward the top left corner of the screen.

Figure 9:
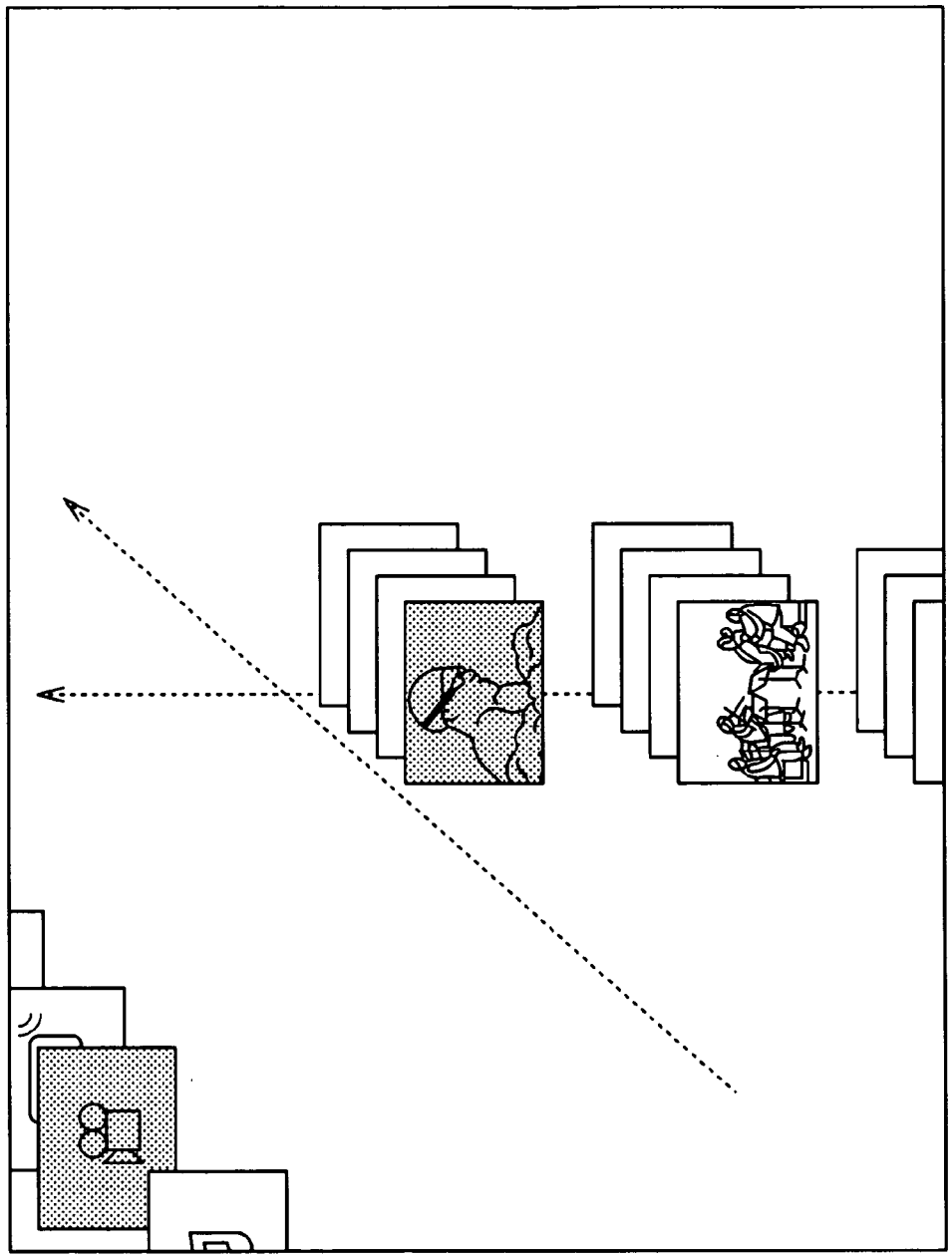
FIG. 9 is another explanatory view of the display process involving the movements of the display axes according to the invention.
Figure 10:
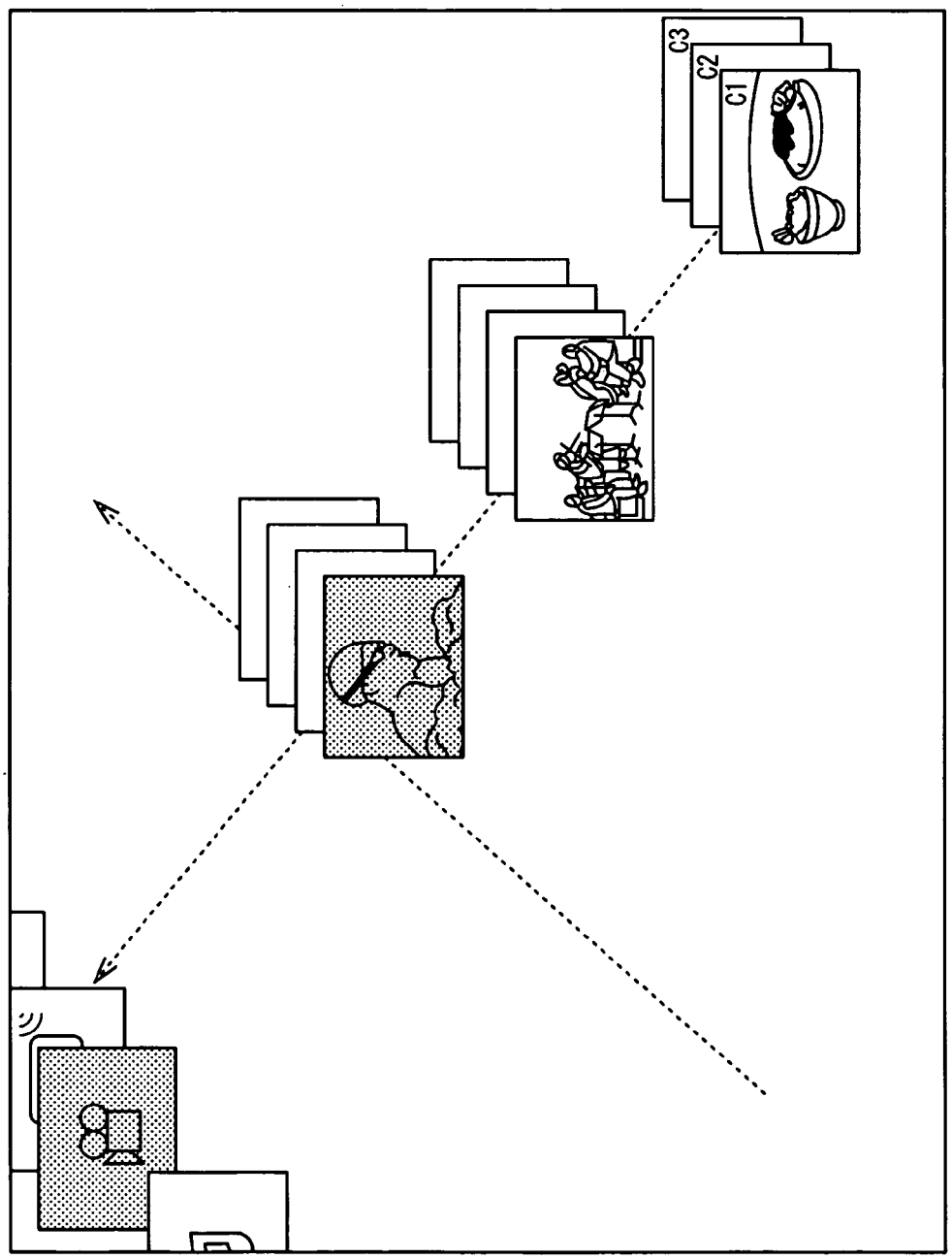
FIG. 10 is another explanatory view of the display process involving the movements of the display axes according to the invention.

After the media icons are relocated into the save area in the top left corner of the screen as shown in FIG. 9, the vertical axis on which one or more thumbnail icon groups are arrayed is rotated counterclockwise as depicted in FIG. 10. Although the vertical axis is turned counterclockwise in this example, this is not limitative of the invention. Alternatively, the vertical axis may be rotated clockwise. The depth axis, shown displayed in this example, may be optionally hidden from view.

Figure 11:
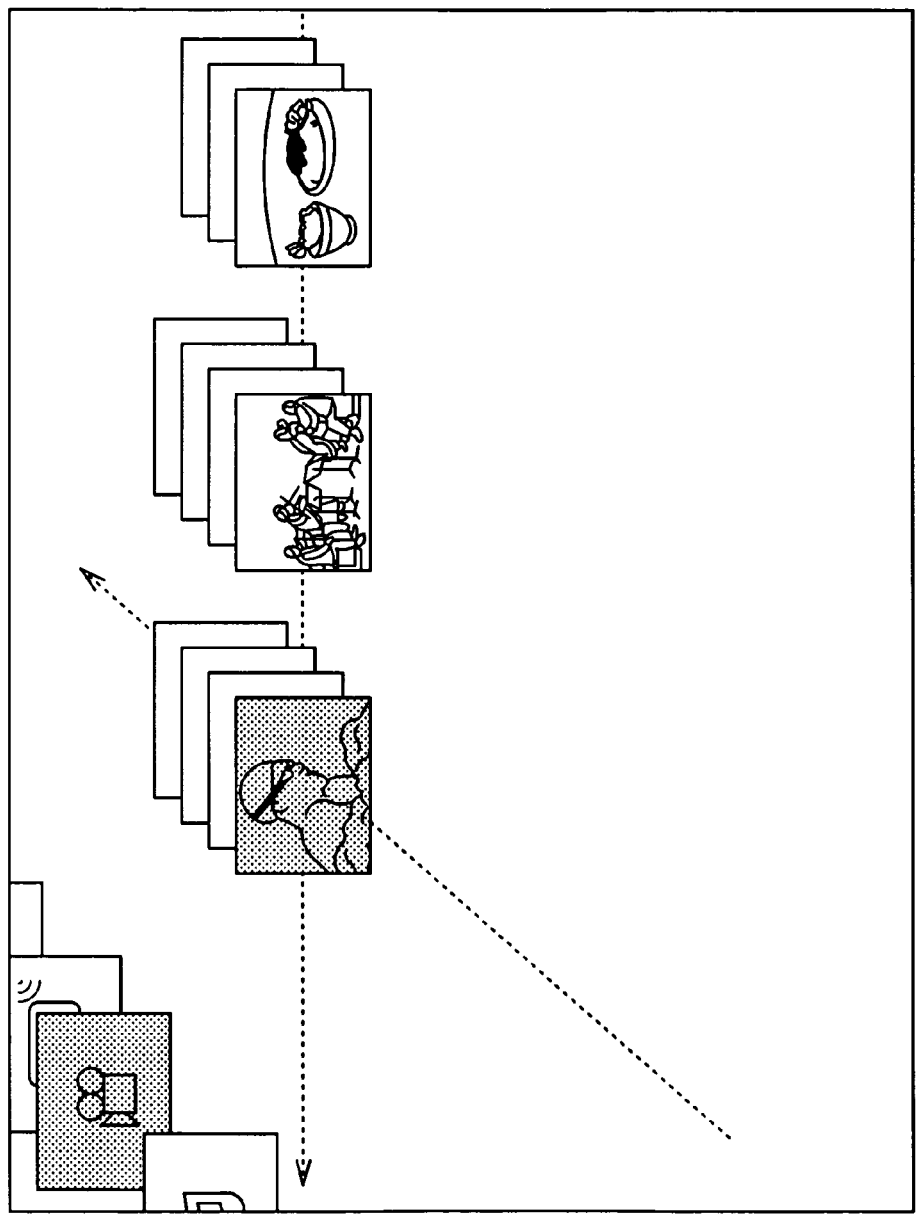
FIG. 11 is another explanatory view of the display process involving the movements of the display axes according to the invention.

When the vertical axis is rotated into the position of the horizontal axis on which the media icons were arrayed, the selected thumbnail icon group is displayed in the leftmost position on the horizontal axis followed by other thumbnail icon groups arrayed successively rightward, as shown in FIG. 11.

The selected thumbnail icon group is displayed at the intersection of the horizontal, vertical and depth axes. The top thumbnail icon of the selected icon group is highlighted.

Figure 12:
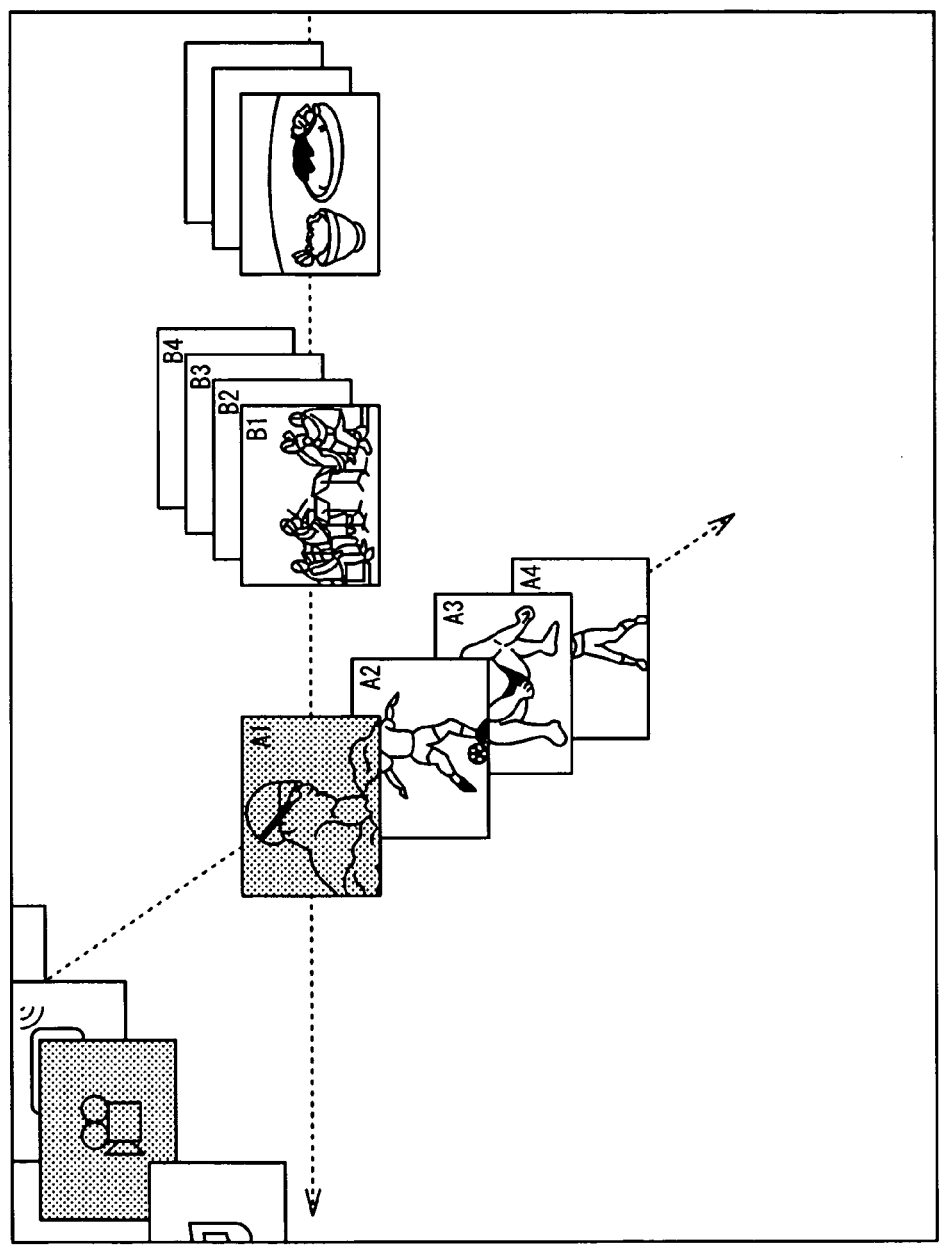
FIG. 12 is another explanatory view of the display process involving the movements of the display axes according to the invention.

As the depth axis shown in FIG. 11 starts rotating clockwise, the one or more thumbnail icons contained in the selected thumbnail icon group (made up of A1 through A4) slide over the rotating depth axis into nonoverlapping positions, as depicted in FIG. 12.

Figure 13:
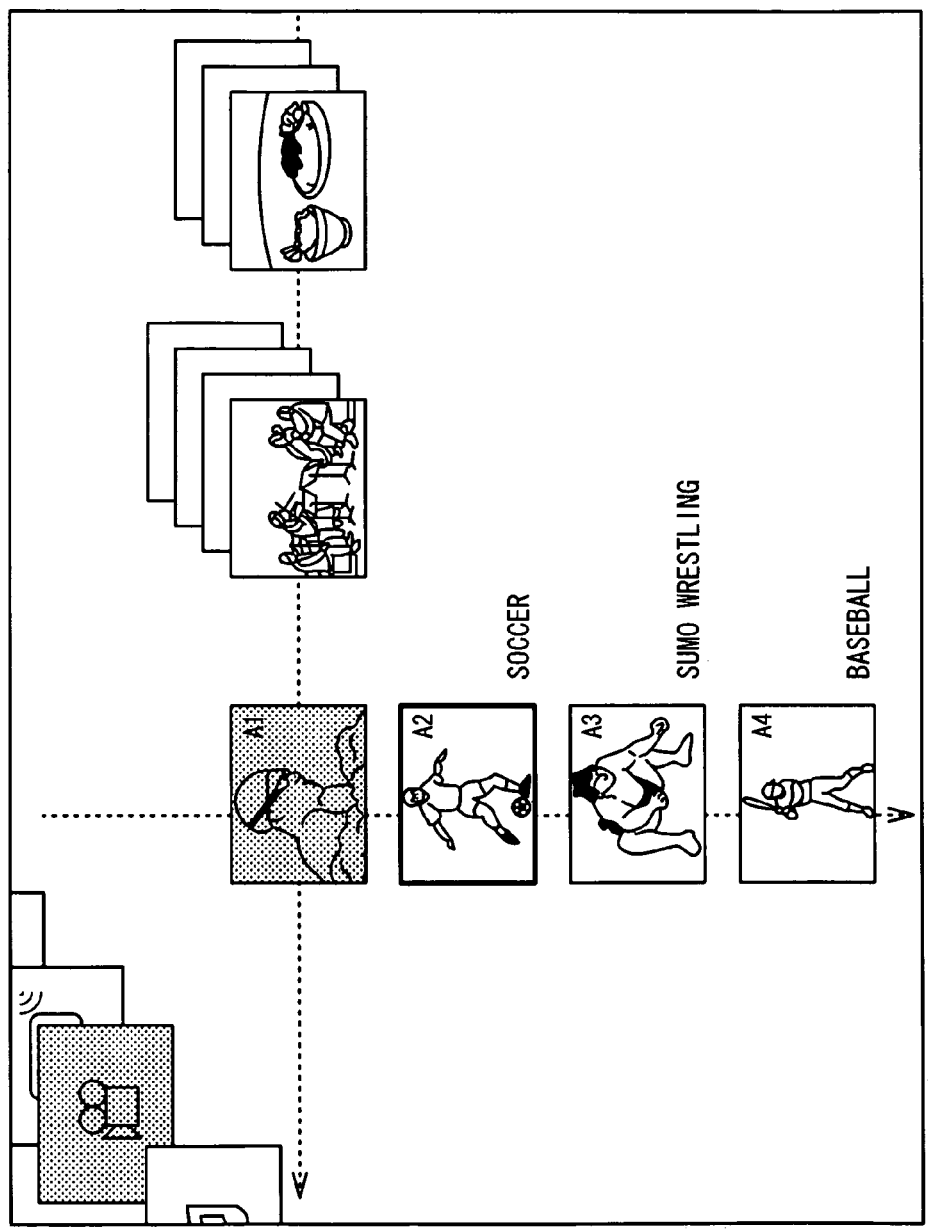
FIG. 13 is another explanatory view of the display process involving the movements of the display axes according to the invention.

After the depth axis is rotated into the position where the thumbnail icon group was displayed as shown in FIG. 13, the grouped thumbnail icons are arrayed on the vertical axis and displayed. The representative thumbnail icon A1 located at the top of the thumbnail icon group is displayed at the intersection of the horizontal and the vertical axes. The thumbnail icon A2 immediately under the representative thumbnail icon A1 is highlighted. The highlighting of the thumbnail icon A2 is done by default; the icon to be highlighted may be changed by the user as desired.

When the screen of FIG. 13 appears, the user may operate the direction determination unit 214 in the vertical direction. This provides scrolling of a desired thumbnail icon among the thumbnail icons displayed on the vertical axis.

On the horizontal axis, as depicted in FIG. 13, thumbnail icon groups are displayed by genre or by some suitable grouping. On the vertical axis, the thumbnail icons contained in the thumbnail icon group selected on the horizontal axis are displayed.

The user may also operate the direction determination unit 214 in the horizontal direction. This causes the thumbnail icon groups to move in the horizontal direction, so that the grouping of the thumbnail icons to be displayed on the vertical axis can be changed.

The user may further operate the direction determination unit 214 up or down. This causes the thumbnail icons arrayed on the vertical axis to move up or down, so that the desired thumbnail icon can be selected. After the desired thumbnail icon is selected, the user may push a button or the like on the instruction determination unit 216 to select the content item corresponding to the selected thumbnail icon.

When the highlighted status of the media icons displayed in the save area in the top left corner of the screen in FIG. 13 is verified, it is easy to ascertain the currently selected function such as recording or reproduction.

Variations of the display screen with this embodiment will now be described with reference to FIGS. 14 and 15. These variations depict an example in which more layers of thumbnail icons come under each of the thumbnail icons arrayed on the vertical axis. The display screens of FIGS. 14 and 15 are derived from the screen in FIG. 13.

Figure 14:
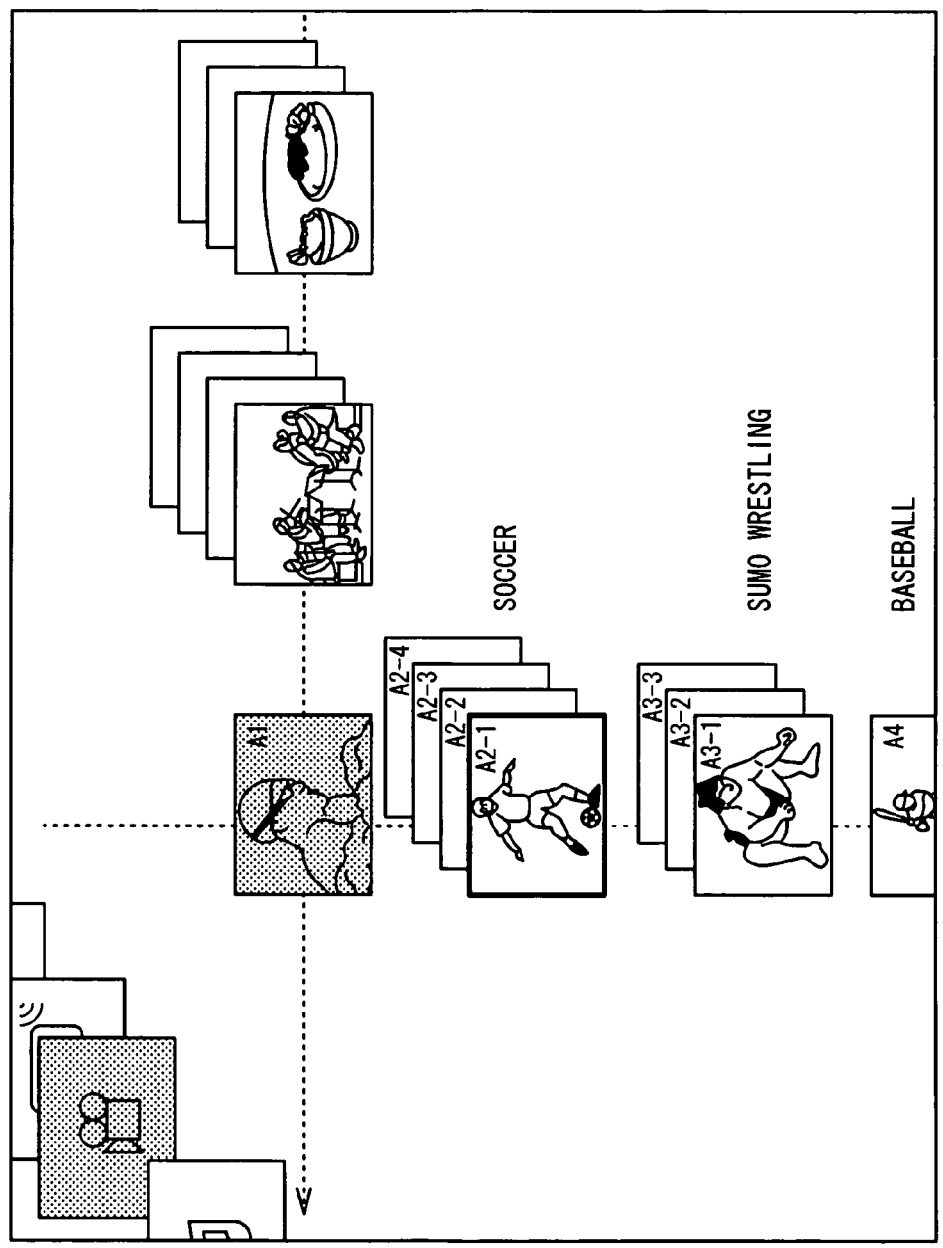
FIG. 14 is a variation of the display screen shown in FIG. 13.
Figure 15:
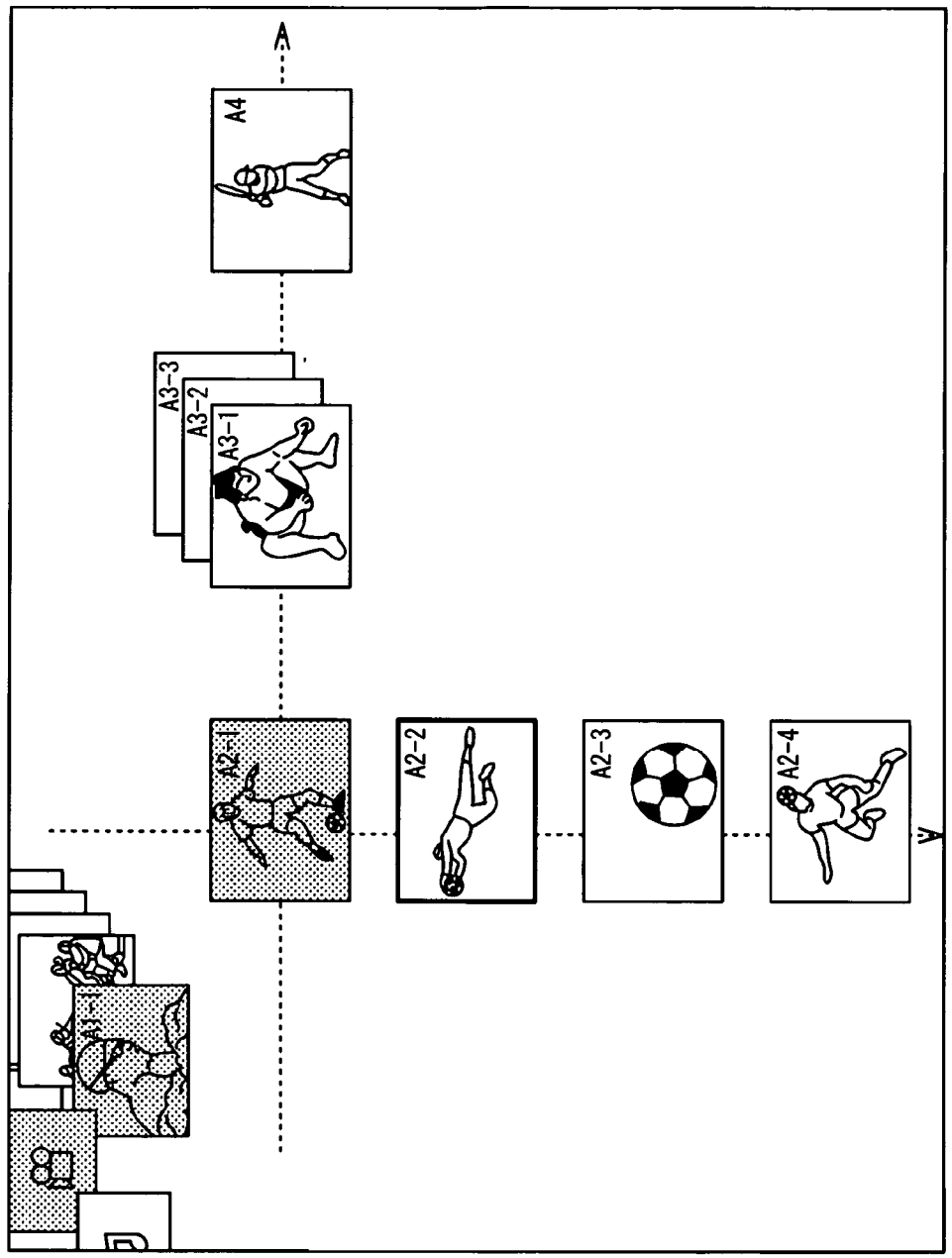
FIG. 15 is another variation of the display screen shown in FIG. 13.

On the screen of the TV set 110, as shown in FIG. 14, appears the screen in effect following the display process involving movements of display axes in step S150.

Thumbnail icon groups shown arrayed on the vertical axis in FIG. 14 have been displayed on the screen as follows: the thumbnail icon group immediately above the current layer is first selected, and the thumbnail icon groups subsumed under that thumbnail icon group are then arrayed on the vertical axis for display on the screen.

A thumbnail icon A2-1 displayed immediately under the representative thumbnail icon A1 is highlighted by default. As shown in FIG. 14, the thumbnail icon group having an attribute "soccer" contains the representative thumbnail icon A2-1, a thumbnail icon A2-2, a thumbnail icon A2-3, and/or a thumbnail icon A2-4.

For example, in the group having the attribute "soccer," the thumbnail icon A2-2 may denote content associated with the European football scene, and the thumbnail icon A2-3 may represent content related to high-school soccer matches in Japan.

As described above, when a thumbnail icon group is selected in the vertical direction, the following takes place: the thumbnail icon groups displayed on the horizontal axis are first moved into the save area. The vertical axis is then rotated into the position of the horizontal axis. The thumbnail icon group selected on the vertical axis has its component thumbnail icons (A1 through A4) arrayed on the vertical axis. The thumbnail icons contained in the selected group (made up of A1 through A4) are then displayed along the vertical axis on the screen as illustrated in FIG. 15.

On the vertical axis in FIG. 15, there is no thumbnail icon group containing one or more thumbnail icons. Alternatively, thumbnail icon groups each containing at least one thumbnail icon may be displayed on the vertical axis. As described above, when any one of such thumbnail icon groups is selected, the icons on the horizontal axis are moved into the save area, the vertical axis is rotated into the position of the horizontal axis, and other operations are carried, whereby the display process of step S150 is executed. Repeating this display process as many times as desired allows any content item in any layer to be searched for and executed by use of a simply structured operating section 210 made of a cross key and buttons.

In the save area in the top left corner of the screen in FIG. 15, one or more media icons or thumbnail icons are displayed in different layers. The display enables the user to verify with ease the currently displayed layers on the screen as the user's history of selections. Although the media icons or other icons displayed in the save area have no display axis, this is not limitative of the invention. Alternatively, these icons may be arrayed and displayed on a suitable display axis.

Media icons or other icons are moved on the screen in synchronism with the simultaneously relocated vertical, horizontal or depth axis on which they are being arrayed. This allows the user to get a clear and easy recognition of the eventually arrayed icons following their movement.

The display process involving movements of display axes with this embodiment of the invention was explained above using examples in which icons are moved into the save area, the vertical axis is rotated into the position of the horizontal axis, and the depth axis is rotated into the position of the vertical axis. However, this is not limitative of the invention. Alternatively, the display process may involve having the icon-moving and axis-rotating processes carried out in parallel. Illustratively, icons may be moved into the save area simultaneously with the vertical and the depth axes being rotated into their respective destinations.

As described, given a list of thumbnail icon groups each having one or more thumbnail icons in the depth direction, the user can have an easy understanding of what content items exist per category and how they are organized.

Selecting a thumbnail icon group of a given category displays the thumbnail icons contained in that group over the screen. This allows the user to look for and pick up the desired content item. Because the save area shows the media icons or other icons that come above the thumbnail icons arrayed on the horizontal or vertical axis, it is easy for the user to verify the current location on the screen, whereby the efficiency of overall search processing is boosted.

One conventional display technique has been known to involve displaying layered content items in a tree structure on the screen. With this technique, it has been hard for the user to keep track of the current location during search for layered content items. A comprehensive overview of the search process has been difficult to maintain as opposed to the inventive scheme.

In the above-described examples, the horizontal, vertical, and depth axes were shown intersecting one another at right angles on the screen. However, this is not limitative of the invention. The horizontal, vertical, and depth axes may alternatively intersect with one another at any angle.

This invention applies at least to the display controlling apparatus, display controlling method, and recording medium for displaying icons on the screen.

It is to be understood that while invention has been described in conjunction with specific embodiments with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A display controlling apparatus for displaying icons representative of data in layers on an external screen and pointing to reproducible content, comprising:

a data input/output unit configured to receive and output data, said data input/output unit including a broadcast input unit configured to transmit broadcast data as said reproducible content;

a direction determination unit configured to receive a direction instruction indicating at least one of four directions in at least one of a horizontal and vertical direction for displaying said icons on said external screen based on a user's operations;

storing means for storing said reproducible content linked to said icons in said layers;

controlling means for generating picture data for displaying, based on said direction instruction, said icons in said layers such that the icons in one of the layers are arrayed on an icon array axis in a first direction, the icons under the icon located at an intersection of said first direction and a second direction are arrayed on an icon array axis in said second direction, and the icons under one of the icons arrayed on said icon array axis in said second direction are arrayed on an icon array axis in a third direction intersecting a plane formed by said first direction and said second direction; and display outputting means for processing said picture data by decoding the associated reproducible content stored in said storing means, and for reproducing the content on a display device, wherein when said operating means obtains the direction instruction for selecting one of the icons arrayed on said icon array axis in said second direction, said controlling means generates said picture data such that said icon array axis in said second direction is moved into said first direction, said icon array axis in said third direction is moved into said second direction, and the selected icon is moved to said intersection of said first direction and said second direction.

2. The display controlling apparatus according to claim 1, wherein said picture data includes a first direction area formed in said first direction, a second direction area formed in said second direction, and a divided space bounded by said first and second direction areas, and when said operating means obtains the direction instruction for selecting one of the icons arrayed on said icon array axis in said second direction, said controlling means moves said icon array axis positioned in said first direction into said divided space.

3. The display controlling apparatus according to claim 1, wherein said icon array axis in said first direction is a horizontal axis, said icon array axis in said second direction is a vertical axis, and said icon array axis in said third direction is a depth axis.

4. The display controlling apparatus according to claim 1, wherein when said operating means obtains the direction instruction for selecting one of the icons arrayed on said icon array axis in said second direction, said controlling means moves said icon array axis positioned in said third direction into said second direction such that a plurality of icons arrayed in imbricate fashion on said icon array axis in said third direction are arrayed in nonoverlapping fashion on said icon array axis in said second direction.

5. The display controlling apparatus according to claim 1, wherein the icon displayed at said intersection is highlighted.

6. The display controlling apparatus according to claim 1, wherein the selected icon is highlighted.

7. A display controlling method for displaying icons representative of data in layers on an external screen and pointing to reproducible content, comprising:

transmitting data including broadcast data as said reproducible content;

receiving a direction instruction indicating at least one of four directions in at least one of a horizontal and vertical direction for displaying said icons on said external screen based on a user's operations;

storing said reproducible content linked to said icons in said layers;

generating picture data, based on said direction instruction, for displaying said icons in said layers such that the icons in one of the layers are arrayed on an icon array axis in a first direction on said external screen, the icons under the icon located at an intersection of said first direction and a second direction are arrayed on an icon array axis in said second direction, and the icons under one of the icons arrayed on said icon array axis in said second direction are arrayed on an icon array axis in a third direction intersecting a plane formed by said first direction and said second direction;

processing the generated picture data by decoding the associated reproducible content; and reproducing the content on a display device, wherein when given the direction instruction for selecting one of the icons arrayed on said icon array axis in said second direction, said generating picture data generates said picture data such that said icon array axis in said second direction is moved from there into said first direction, said icon array axis in said third direction is moved from there into said second direction, and the selected icon is moved to said intersection of said first direction and said second direction.

8. The display controlling method according to claim 7, wherein said picture data includes a first direction area formed in said first direction, a second direction area formed in said second direction, and a divided space bounded by said first and second direction areas, and when given the direction instruction for selecting one of the icons arrayed on said icon array axis in said second direction, said generating picture data acting on the direction instruction moves said icon array axis positioned in said first direction into said divided space.

9. The display controlling method according to claim 7, wherein said icon array axis in said first direction is a horizontal axis, said icon array axis in said second direction is a vertical axis, and said icon array axis in said third direction is a depth axis.

10. The display controlling method according to claim 7, wherein when given the direction instruction for selecting one of the icons arrayed on said icon array axis in said second direction, said generating picture data moves said icon array axis positioned in said third direction into said second direction such that a plurality of icons arrayed in imbricate fashion on said icon array axis in said third direction are arrayed in nonoverlapping fashion on said icon array axis in said second direction.

11. The display controlling method according to claim 7, wherein the icon displayed at said intersection is highlighted.

12. The display controlling method according to claim 7, wherein the selected icon is highlighted.

13. A recording medium which records in computer-readable fashion a computer program for causing a computer to carry out a display controlling method for displaying icons representative of data in layers on an external screen and pointing to reproducible content, comprising:

transmitting data including broadcast data as said reproducible content;

receiving a direction instruction indicating at least one of four directions in at least one of a horizontal and vertical direction for displaying said icons on said external screen based on a user's operations;

storing said reproducible content linked to said icons in said layers;

generating picture data, based on said direction instruction, for displaying said icons in said layers such that the icons in one of the layers are arrayed on an icon array axis in a first direction on said external screen, the icons under the icon located at an intersection of said first direction and a second direction are arrayed on an icon array axis in said second direction, and the icons under one of the icons arrayed on said icon array axis in said second direction are arrayed on an icon array axis in a third direction intersecting a plane formed by said first direction and said second direction;

processing the generated picture data by decoding the associated reproducible content; and reproducing the content on a display device, wherein when given the direction instruction for selecting one of the icons arrayed on said icon array axis in said second direction, said generating picture data generates said picture data such that said icon array axis in said second direction is moved from there into said first direction, said icon array axis in said third direction is moved from there into said second direction, and the selected icon is moved to said intersection of said first direction and said second direction.

14. A display controlling apparatus for displaying icons representative of data in layers on an external screen and pointing to reproducible content, comprising:
 a data input/output unit configured to receive and output data, said data input/output unit including a broadcast input unit configured to transmit broadcast data as said reproducible content;
 a direction determination unit configured to receive a direction instruction indicating at least one of four directions in at least one of a horizontal and vertical direction for displaying said icons on said external screen based on a user's operations;
 a unit configured to store said reproducible content linked to said icons in said layers;
 a storing unit configured to store data constituting said icons in said layers;
 a controlling unit configured to generate picture data for displaying said icons in said layers such that the icons in one of the layers are arrayed on an icon array axis in a first direction on said external screen, the icons under the icon located at an intersection of said first direction and a second direction are arrayed on an icon array axis in said second direction, and the icons under one of the icons arrayed on said icon array axis in said second direction are arrayed on an icon array axis in a third direction intersecting a plane formed by said first direction and said second direction; and
 a display unit configured to process said picture data by decoding the associated reproducible content stored in said storing unit, and to reproduce the content on a display device, wherein
 when said operating unit obtains the direction instruction to select one of the icons arrayed on said icon array axis in said second direction, said controlling unit acting on the direction instruction generates said picture data such that said icon array axis in said second direction is moved from there into said first direction, said icon array axis in said third direction is moved from there into said second direction, and the selected icon is moved to said intersection of said first direction and said second direction.

15. The display controlling apparatus according to claim 14, wherein said picture data includes a first direction area formed in said first direction, a second direction area formed in said second direction, and a divided space bounded by said first and second direction areas, wherein
 when said operating unit obtains the direction instruction for selecting one of the icons arrayed on said icon array axis in said second direction, said controlling unit acting on the direction instruction moves said icon array axis positioned in said first direction into said divided space.

16. The display controlling apparatus according to claim 14, wherein said icon array axis in said first direction is a horizontal axis, said icon array axis in said second direction is a vertical axis, and said icon array axis in said third direction is a depth axis.

17. The display controlling apparatus according to claim 14, wherein when said operating unit obtains the direction instruction to select one of the icons arrayed on said icon array axis in said second direction, said controlling unit acting on said instruction moves said icon array axis positioned in said third direction into the direction second direction such that a plurality of icons arrayed in imbricate fashion on said icon array axis in said third direction are arrayed in nonoverlapping fashion on said icon array axis in said second direction.

18. The display controlling apparatus according to claim 14, wherein the icon displayed at said intersection is highlighted.

19. The display controlling apparatus according to claim 14, wherein the selected icon is highlighted.

20. The display controlling apparatus according to claim 1, wherein the icons are grouped into different music genres, and an icon at the top of a given group is a representative icon indicating a music genre to which the remaining icons belong.

21. The display controlling apparatus according to claim 1, wherein the reproducible content includes at least one of movie data, music data, image data, and sound data.

* * * * *